United States Patent
Tryon et al.

(10) Patent No.: US 10,830,341 B2
(45) Date of Patent: Nov. 10, 2020

(54) CONTROL SYSTEM AND METHOD THEREOF FOR MULTISPEED TRANSMISSION

(71) Applicant: ALLISON TRANSMISSION, INC., Indianapolis, IN (US)

(72) Inventors: Eric Tryon, Fishers, IN (US); Charles F. Long, Zionsville, IN (US); Bryan Hagelskamp, Carmel, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 198 days.

(21) Appl. No.: 16/013,072

(22) Filed: Jun. 20, 2018

(65) Prior Publication Data

US 2019/0003585 A1 Jan. 3, 2019

Related U.S. Application Data

(60) Provisional application No. 62/527,202, filed on Jun. 30, 2017.

(51) Int. Cl.
  *F16H 61/00* (2006.01)
  *F16H 61/02* (2006.01)
  (Continued)

(52) U.S. Cl.
  CPC .......... *F16H 61/0021* (2013.01); *F15B 11/20* (2013.01); *F15B 13/06* (2013.01);
  (Continued)

(58) Field of Classification Search
  CPC .. F16H 61/0021; F16H 61/0206; F16H 61/12; F16H 2061/026; F16H 2061/1292;
  (Continued)

(56) References Cited

U.S. PATENT DOCUMENTS

| 3,667,501 A | 6/1972 | Snoy et al. |
| 4,070,927 A | 1/1978 | Polak |

(Continued)

FOREIGN PATENT DOCUMENTS

WO   2015137906 A1   9/2015

OTHER PUBLICATIONS

International Search Report and Written Opinion for PCT/US2018/038476, Korean Intellectual Property Office, dated Oct. 26, 2018.

*Primary Examiner* — Tisha D Lewis
(74) *Attorney, Agent, or Firm* — Taft, Stettinius & Holisster LLP; Stephen F. Rost

(57) ABSTRACT

An electro-hydraulic control system for a multispeed transmission having a plurality of torque-transmitting mechanisms includes a controller for operably controlling the transmission, a fluid source for supplying hydraulic fluid, and a plurality of torque-transmitting mechanisms being operably selected between an applied and an unapplied state to achieve a plurality of ranges including at least one reverse, a neutral, and a plurality of forward ranges. The system includes a plurality of trim systems having pressure control solenoids and trim valves. The system may also include one or more shift valves disposed in fluid communication with the fluid source and being capable of moving between stroked and de-stroked positions. In any given range, only two of the plurality of torque-transmitting mechanisms may be applied. Moreover, three of the plurality of pressure control solenoids are normally high solenoids, and the remaining solenoids are normally low solenoids.

20 Claims, 22 Drawing Sheets

(51) Int. Cl.
*F16H 61/12* (2010.01)
*F15B 11/20* (2006.01)
*F15B 13/06* (2006.01)

(52) U.S. Cl.
CPC ......... *F16H 61/0206* (2013.01); *F16H 61/12* (2013.01); *F15B 2211/71* (2013.01); *F16H 2061/026* (2013.01); *F16H 2061/1292* (2013.01); *F16H 2200/0065* (2013.01)

(58) Field of Classification Search
CPC .. F16H 2200/0065; F15B 11/20; F15B 13/06; F15B 2211/71
See application file for complete search history.

(56) References Cited

U.S. PATENT DOCUMENTS

| | | | |
|---|---|---|---|
| 4,495,837 A | 1/1985 | Morscheck | |
| 4,631,982 A * | 12/1986 | Miki | F16H 61/0437 477/117 |
| 4,827,806 A | 5/1989 | Long et al. | |
| 4,838,298 A | 6/1989 | Cleasby | |
| 5,399,130 A | 3/1995 | Long | |
| 5,492,028 A | 2/1996 | Raszkowski | |
| 5,496,231 A | 3/1996 | Eaton | |
| 5,616,093 A * | 4/1997 | Long | F16H 61/0206 475/120 |
| 5,682,791 A | 11/1997 | Liesener | |
| 5,738,608 A | 4/1998 | Long | |
| 6,155,949 A | 12/2000 | Long et al. | |
| 6,319,164 B1 | 11/2001 | Runde et al. | |
| 6,464,609 B1 | 10/2002 | Bai et al. | |
| 6,520,881 B1 | 2/2003 | Long et al. | |
| 6,585,617 B1 | 7/2003 | Moorman et al. | |
| 6,634,377 B1 | 10/2003 | Stafford | |
| 6,634,988 B2 | 10/2003 | Shultz et al. | |
| 6,796,330 B1 | 9/2004 | Moorman | |
| 6,832,632 B1 | 12/2004 | Wallace | |
| 7,220,206 B2 | 5/2007 | Borgerson et al. | |
| 7,285,066 B2 | 10/2007 | Long et al. | |
| 7,288,039 B2 | 10/2007 | Foster et al. | |
| 7,322,899 B1 | 1/2008 | Long et al. | |
| 7,395,837 B2 | 7/2008 | Foster et al. | |
| 7,396,306 B2 | 7/2008 | Long et al. | |
| 7,510,496 B2 | 3/2009 | Long et al. | |
| 7,651,427 B2 | 1/2010 | Long et al. | |
| 7,666,112 B2 | 2/2010 | Long et al. | |
| 7,736,269 B2 | 6/2010 | Long et al. | |
| 7,823,473 B2 | 11/2010 | Uberti et al. | |
| 7,878,934 B2 | 2/2011 | Lee | |
| 7,896,769 B2 | 3/2011 | Long et al. | |
| 7,980,995 B2 | 7/2011 | Weber et al. | |
| 7,993,231 B2 | 8/2011 | Shimizu et al. | |
| 8,052,563 B2 | 11/2011 | Ellis et al. | |
| 8,100,803 B2 | 1/2012 | Foster et al. | |
| 8,113,988 B2 | 2/2012 | Foster | |
| 8,172,060 B2 | 5/2012 | Seid et al. | |
| 8,371,988 B2 | 2/2013 | Long et al. | |
| 8,413,777 B2 | 4/2013 | Lundberg et al. | |
| 8,435,148 B2 | 5/2013 | Moorman | |
| 8,464,851 B2 | 6/2013 | Moorman | |
| 8,613,681 B2 | 12/2013 | Sowards et al. | |
| 8,852,049 B2 | 10/2014 | Long et al. | |
| 9,097,338 B2 | 8/2015 | Hagelskamp | |
| 9,182,034 B2 | 11/2015 | Long et al. | |
| 9,222,578 B2 | 12/2015 | Long | |
| 9,254,831 B2 | 2/2016 | Berger et al. | |
| 9,267,582 B2 | 2/2016 | Long et al. | |
| 9,347,555 B2 | 5/2016 | Long et al. | |
| 9,447,868 B2 | 9/2016 | Hagelskamp | |
| 9,512,919 B2 | 12/2016 | Kinch | |
| 9,562,594 B2 | 2/2017 | Long et al. | |
| 9,683,666 B2 | 6/2017 | Kinch | |
| 9,765,877 B2 | 9/2017 | Long et al. | |
| 2002/0137594 A1* | 9/2002 | Futamura | F16H 61/0206 477/75 |
| 2006/0184303 A1 | 8/2006 | Long et al. | |
| 2007/0049442 A1 | 3/2007 | Long et al. | |
| 2011/0167812 A1 | 7/2011 | Moorman | |
| 2012/0261008 A1 | 10/2012 | Long et al. | |
| 2015/0075315 A1* | 3/2015 | Hagelskamp | F16H 61/0206 74/473.11 |
| 2017/0030419 A1 | 2/2017 | Mitsubori et al. | |
| 2017/0067558 A1 | 3/2017 | Knoth et al. | |
| 2019/0003579 A1* | 1/2019 | Tryon | F16H 61/061 |

* cited by examiner

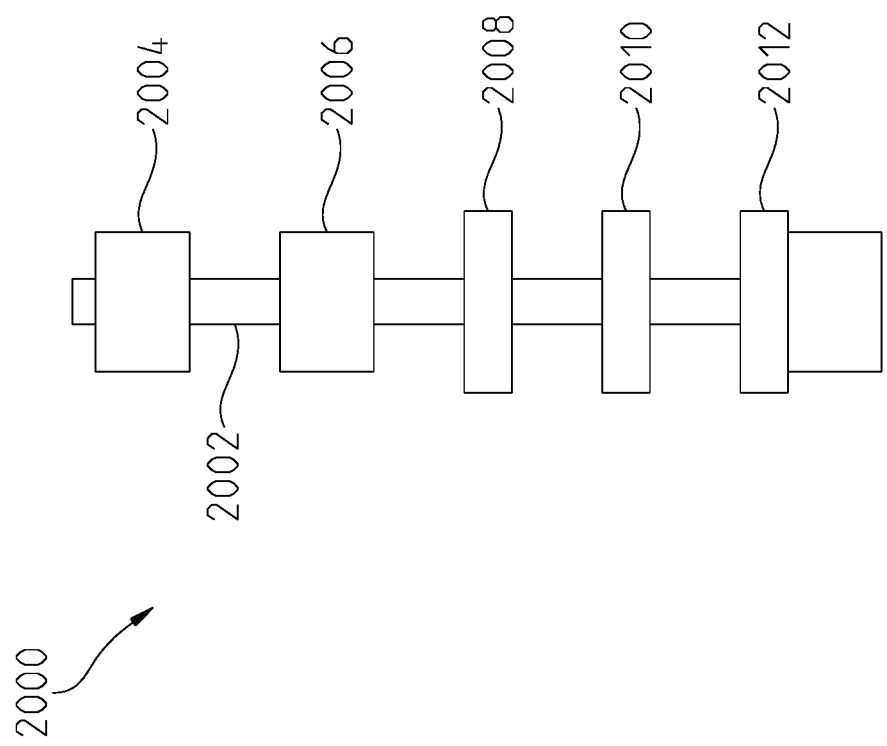

| STEADY STATE RANGE | N/L SS1 | | N/L SS2 | N/H PCS 1 | N/H PCS 2 | N/H PCS 3 | N/L PCS 4 | N/L PCS 5 | HYDRAULIC DEFAULT |
|---|---|---|---|---|---|---|---|---|---|
| | SV1 | SV2 | SV3 | | | | | | |
| R | 0 | 0 | 1 | C1 | C2/C5 | C3 | C4 | C6 | C3N |
| N | 0 | 0 | 1 | - | C5 | C3 | C4 | - | C3N |
| 1st | 1 | 0 | 1 | C1 | C5 | C3 | C4 | C6 | 5th |
| 2nd | 1 | 0 | 1 | C1 | C5 | C3 | C4 | C6 | 5th |
| 3rd | 1 | 0 | 0 | C1 | C5 | C3 | C4 | C6 | 5th |
| 4th | 1 | 0 | 0 | C1 | - | C3 | C4 | C6 | 5th |
| 5th | 1 | 0 | 0 | C1 | - | C3 | C4 | C6 | 5th |
| 6th | 1 | 1 | 1 | C1 | C2 | C3 | C4 | C6 | 7th |
| 7th | 1 | 1 | 0 | - | C2 | C3 | C4 | C6 | 7th |
| 8th | 1 | 1 | 0 | - | C2 | C3 | C4 | C6 | 7th |
| 9th | 1 | 1 | 0 | - | C2 | C3 | C4 | C6 | 7th |

|   | R | N | 1 | 2 | 3 | 4 | 5 | 6 | 7 | 8 | 9 |
|---|---|---|---|---|---|---|---|---|---|---|---|
| R | 0 | 1 | 1 | 1 |   |   |   |   |   |   |   |
| N | 1 | 0 | 1 | 1 |   |   |   |   |   |   |   |
| 1 | 1 | 1 | 0 | 1 | 1 | 2 |   |   |   |   |   |
| 2 | 1 | 1 | 1 | 0 | 1 | 1 | 1 | 1 |   |   |   |
| 3 |   | 1 | 1 | 0 | 1 | 1 | 1 | 2 |   |   |   |
| 4 |   |   | 1 | 1 | 0 | 1 | 1 | 2 | 1 | 2 |   |
| 5 |   |   |   | 1 | 1 | 0 | 1 | 1 | 2 | 2 |   |
| 6 |   |   |   |   | 1 | 1 | 0 | 1 | 1 | 1 |   |
| 7 |   |   |   |   |   | 1 | 1 | 0 | 1 | 1 |   |
| 8 |   |   |   |   |   |   | 1 | 1 | 0 | 1 |   |
| 9 |   |   |   |   |   |   | 1 | 1 | 1 | 0 |   |

CONTROL SYSTEM AND METHOD THEREOF FOR MULTISPEED TRANSMISSION

RELATED APPLICATIONS

This application claims the benefit of U.S. Provisional Patent Application Ser. No. 62/527,202, filed Jun. 30, 2017, the disclosure of which is hereby incorporated by reference in its entirety.

FIELD OF THE DISCLOSURE

The present disclosure relates to a method of controlling a transmission system, and in particular to a method of controlling hydraulic fluid for a multispeed transmission.

BACKGROUND

Multiple speed transmission uses a number of friction clutches or brakes, planetary gearsets, shafts, and other elements to achieve a plurality of gear or speed ratios. The transmission architecture, i.e., the packaging or layout of the aforementioned elements, is determined based on cost, size, packaging constraints, and desired ratios. A control system is needed for controlling these elements and provide desirable shift quality. Moreover, with more ranges being provided for improved fuel economy among other reasons, the control system must ensure the correct clutches or brakes are applied in any given range, and further provide for fault ranges in the event of a loss of electrical power. With more forward and reverse ranges for any given multispeed transmission, the control system continues to increase in complexity.

SUMMARY

In one embodiment of the present disclosure, an electro-hydraulic control system for a multispeed transmission includes a controller for operably controlling the transmission; a fluid source for supplying hydraulic fluid; a plurality of torque-transmitting mechanisms being operably selected between an applied and an unapplied state to achieve a plurality of ranges including at least one reverse, a neutral, and a plurality of forward ranges, wherein in any one of the plurality of forward ranges only two of the plurality of torque-transmitting mechanisms are in the applied state; a plurality of trim systems being in electrical communication with the controller and in fluid communication with the fluid source, wherein each of the plurality of trim systems includes a pressure control solenoid and a trim valve; a plurality of shift valves each of which is disposed in fluid communication with the fluid source and configured to move between a stroked position and a de-stroked position, the plurality of shift valves including at least a first shift valve, a second shift valve and a third shift valve; wherein, a latch is formed by hydraulic fluid in the system against at least one of the first, second and third shift valves during a shift from one of the plurality of forward ranges to neutral such that the at least one of the first, second and third shift valves is maintained in its stroked position due to the latch.

In a first example of this embodiment, the latch is formed by a check valve located between the at least one of the first, second and third shift valves and an exhaust passage. In a second example, at least one of the first, second and third shift valves is fluidly biased to move from its stroked position to its de-stroked position during the shift to neutral. In a third example, three of the first, second, third, fourth and fifth pressure control solenoids comprise normally high solenoids, and the other two solenoids comprise normally low solenoids. In a fourth example, a pressure switch may be disposed in fluid communication with the at least one of the first, second and third shift valves and in electrical communication with the controller, the pressure switch configured to detect a position of the at least one of the first, second and third shift valves.

In a fifth example, a first torque-transmitting mechanism and a second torque-transmitting mechanism are in their applied states in a first range of the plurality of forward ranges; and the first torque-transmitting mechanism remains in its applied state and the second torque-transmitting mechanism exhausts to its unapplied state during the shift to neutral. In a sixth example, the latch is formed by a flow restriction and check valve located between the at least one of the first, second and third shift valves and an exhaust passage.

In another embodiment of the present disclosure, an electro-hydraulic control system for a multispeed transmission includes a controller for operably controlling the transmission; a fluid source for supplying hydraulic fluid; a plurality of torque-transmitting mechanisms being operably selected between an applied and an unapplied state to achieve a plurality of ranges including at least one reverse, a neutral, and a plurality of forward ranges, wherein in any one of the plurality of forward ranges only two of the plurality of torque-transmitting mechanisms are in the applied state; a plurality of trim systems being in electrical communication with the controller and in fluid communication with the fluid source, wherein each of the plurality of trim systems includes a pressure control solenoid and a trim valve; a plurality of shift valves each of which is disposed in fluid communication with the fluid source and configured to move between a stroked position and a de-stroked position, the plurality of shift valves including at least a first shift valve, a second shift valve and a third shift valve; a first shift solenoid and a second shift solenoid each of which is disposed in electrical communication with the controller, the first shift solenoid being operably controlled between an energized and de-energized states to control movement of the first and second shift valves, and the second shift solenoid being operably controlled between an energized and de-energized states to control movement of the third shift valve; wherein in a first forward range of the plurality of forward ranges, a first torque-transmitting mechanism and a second torque-transmitting mechanism are in their applied states; the first shift solenoid is energized to control movement of the first and second shift valves to their stroked positions such that hydraulic fluid at a head of each of the first and second shift valves forces both shift valves to their stroked positions; further wherein, when shifting from the first forward range to neutral, the first torque-transmitting mechanism remains in its applied state as the only applied torque-transmitting mechanism, and the second torque-transmitting mechanism is exhausted.

In one example of this embodiment, a latch is formed by hydraulic fluid in the system against at least one of the first, second and third shift valves when shifting to neutral from the first forward range. In a second example, at least one of the first and second shift valves is maintained in its stroked position due to the latch. In a third example, the first and second shift valves are maintained in their stroked positions due to the latch. In another example, the latch is formed by a check valve located between the at least one of the first, second and third shift valves and an exhaust passage. In a further example, the latch is formed by a flow restriction and check valve located between the at least one of the first, second and third shift valves and an exhaust passage. In yet another example, a pressure switch may be disposed in fluid communication with the at least one of the first, second and third shift valves and in electrical communication with the controller, the pressure switch configured to detect a position of the at least one of the first, second and third shift valves.

In a further embodiment of the present disclosure, an electro-hydraulic control system for a multispeed transmission includes a controller for operably controlling the transmission; a fluid source for supplying hydraulic fluid; a plurality of torque-transmitting mechanisms being operably selected between an applied and an unapplied state to achieve a plurality of ranges including at least one reverse, a neutral, and a plurality of forward ranges, wherein in any one of the plurality of forward ranges only two of the plurality of torque-transmitting mechanisms are in the applied state; a plurality of trim systems being in electrical communication with the controller and in fluid communication with the fluid source, wherein each of the plurality of trim systems includes a pressure control solenoid and a trim valve; a plurality of shift valves each of which is disposed in fluid communication with the fluid source and configured to move between a stroked position and a de-stroked position, the plurality of shift valves including at least a first shift valve, a second shift valve and a third shift valve; a first shift solenoid disposed in electrical communication with the controller, the first shift solenoid being operably controlled between an energized and de-energized states to control movement of the first and second shift valves; and a second shift solenoid disposed in electrical communication with the controller, the second shift solenoid being operably controlled between an energized and de-energized states to control movement of the third shift valve; wherein, movement of the first shift valve between its stroked and de-stroked positions is operably controlled by the controller to select a desired range of the plurality of ranges.

In one example of this embodiment, in neutral and the at least one reverse, the controller operably controls movement of the first shift valve to its de-stroked position; and in each of the plurality of forward ranges, the controller operably controls movement of the first shift valve to its stroked position. In another example, a plurality of pressure switches is disposed in electrical communication with the controller, the plurality of pressure switches includes at least a first pressure switch, a second pressure switch and a third pressure switch. In yet another example, the first pressure switch is in fluid communication with the first shift valve to detect a position thereof; the second pressure switch is in fluid communication with the second shift valve to detect a position thereof; and the third pressure switch is in fluid communication with the third shift valve to detect a position thereof.

In a further example, in neutral and the at least one reverse, the controller operably controls movement of the first shift valve to its de-stroked position; in each of the plurality of forward ranges, the controller operably controls movement of the first shift valve to its stroked position; the first pressure switch is either pressurized or not pressurized based on the position of the first shift valve; and the controller operably detects the position of the first shift valve based on whether the first pressure switch is pressurized or not pressurized.

In yet a further example of this embodiment, the system may include a fourth pressure switch disposed in fluid communication with a first trim system of the plurality of trim systems; and a first torque-transmitting mechanism of the plurality of torque-transmitting mechanisms being in fluid communication with the first trim system; wherein, the fourth pressure switch is either pressurized or not pressurized based upon a position of the trim valve of the first trim system; further wherein, the position of the trim valve and whether the first torque-transmitting mechanism is in its applied state or unapplied state is operably detectable by the controller based on if the fourth pressure switch is pressurized or not.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 20 is one embodiment of a schematic of a third shift valve;

FIG. 22 is one embodiment of a shift availability table of the multispeed transmission system of FIG. 2.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The terminology used herein is for the purpose of describing particular illustrative embodiments only and is not intended to be limiting. As used herein, the singular forms "a", "an" and "the" may be intended to include the plural forms as well, unless the context clearly indicates otherwise. Similarly, plural forms may have been used to describe particular illustrative embodiments when singular forms would be applicable as well. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
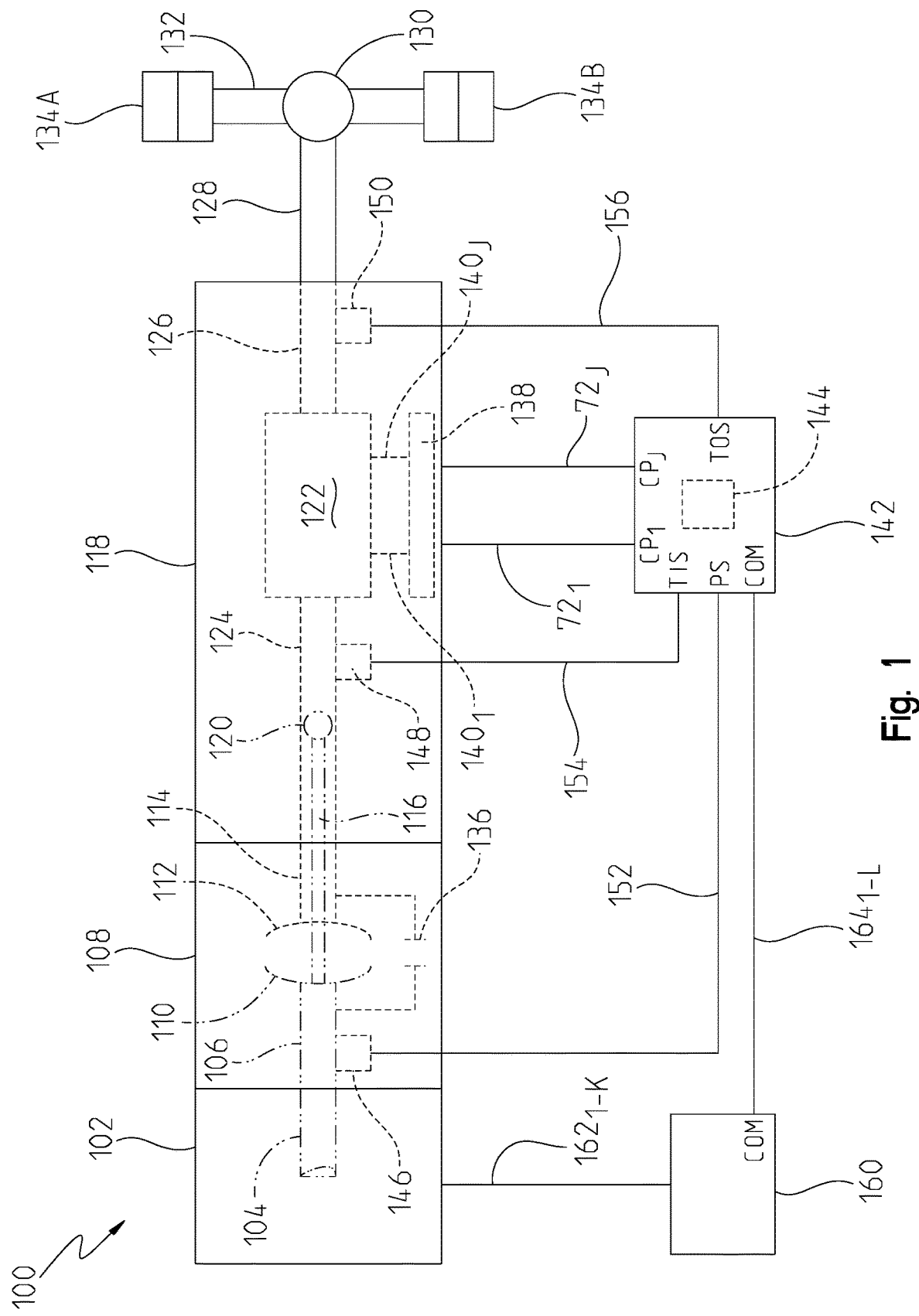
FIG. 1 is a block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when torque multiplication is not needed. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$ where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump 120 which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a Society of Automotive Engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
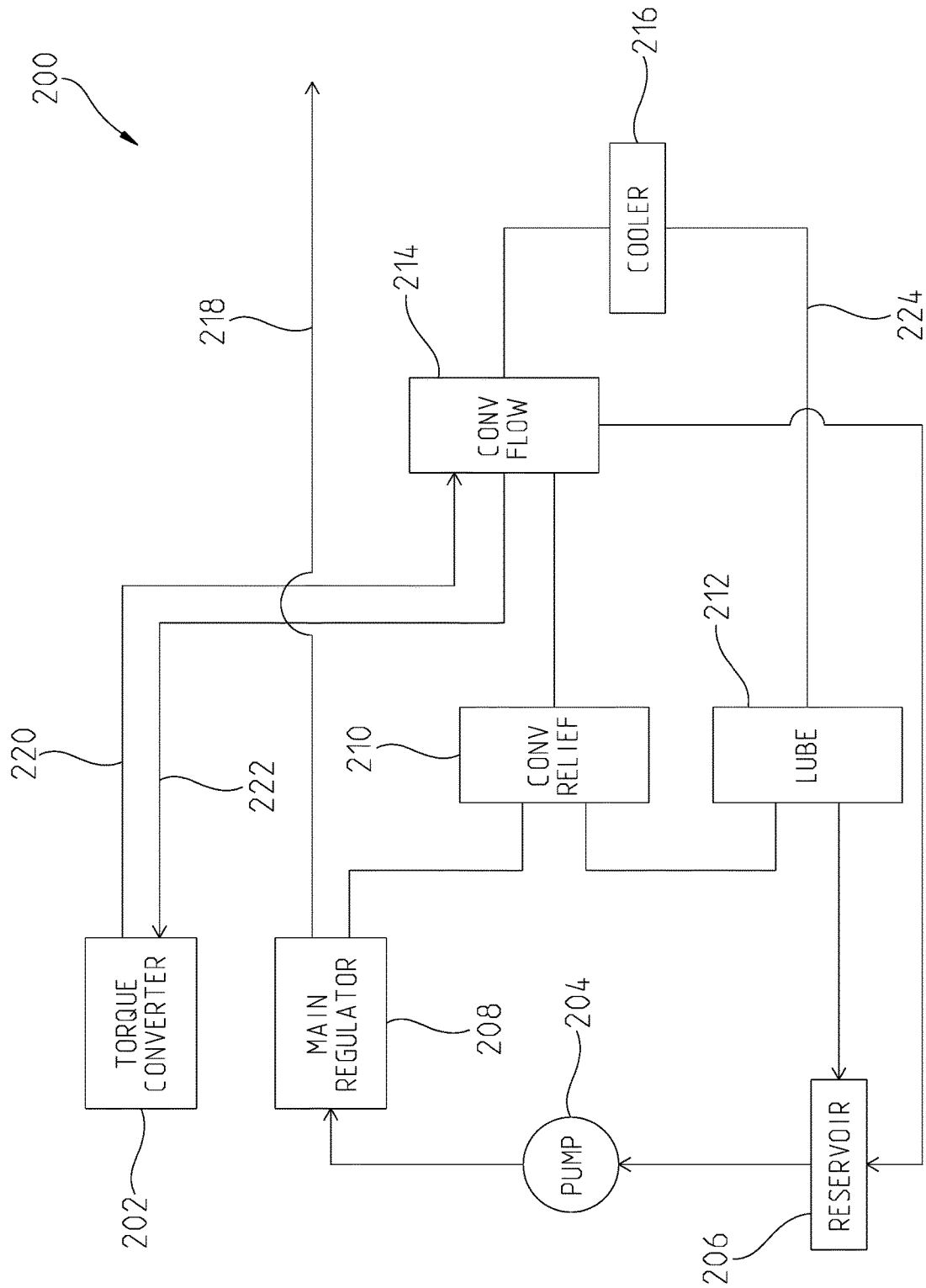
FIG. 2 is a partial controls schematic of a multispeed transmission system.

Referring to FIG. 2, a hydraulic control system is illustrated for a multispeed transmission system 200. The system 200 may include similar features of the transmission 118 of FIG. 1. For example, the system 200 may include a torque converter 202 or other fluid-coupling device for fluidly coupling the transmission system 200 to an engine or other prime mover 102. The torque converter 202 may include a lockup clutch (not shown) similar to the clutch 136 of FIG. 1. Moreover, the transmission system 200 may include a main fluid pump 204 for providing hydraulic fluid and pressure throughout the system. The pump 204 may be similar to the internal pump 120 of FIG. 1. Here, the pump 204 may be fluidly coupled to a reservoir 206 or sump that provides a fluid to a suction side of the pump 204. In this disclosure, the pump 204 may be referred to as the fluid or pressure source of the system 200.

The transmission system 200 may include other systems or sub-systems such as a pressure regulator system, a lube system, a converter system, and a cooler system. In FIG. 2, the transmission system 200 may include a main regulator 208 that is in fluid communication with the pump 204. The main regulator 208 may be a valve or other fluid-regulating mechanism for regulating a main pressure in the system 200. In this disclosure, a full main pressure may be provided by the pump 204 to the transmission system 200. The main regulator 208 may regulate this pressure, and as will be described below, other solenoids and the like may be triggered to further regulate main pressure. In any event, the main regulator forms part of the pressure regulator system, and main pressure flows from the main regulator 208 to a main pressure circuit 218 of the transmission system 200 as will be described below.

The main regulator 208 is further fluidly coupled to the converter system. The converter system may include the torque converter 202, a converter relief 210, and a converter flow 214. In one example, the converter relief 210 and converter flow 214 may be valves. Hydraulic fluid may flow from the main regulator 208 to the converter relief 210 and converter flow 214. Moreover, fluid may flow from the converter flow 214 to the torque converter 202 via a converter-in passage 222, and fluid may flow from the torque converter 202 to the converter flow 214 via a converter-out passage 220. In this way, fluid pressure can flow to and from the torque converter to better regulate a fluid operating temperature in the torque converter 202 and provide cooler fluid to protect the lockup clutch, if applicable. There may be other reasons or advantages for fluidly coupling the torque converter 202 to the converter flow 214 as may be appreciated by the skilled artisan.

The transmission system 200 may also include a lube system and a cooler system. The lube system may include a lube regulator 212 for regulating pressure to cool clutches, brakes and the like in the system 200. The cooler system may include a cooler 216, such as a vehicle cooler, that may be disposed outside of the transmission system 200. Nevertheless, the cooler 216 may be in fluid communication with the converter flow 214 and the lube regulator 212, as shown in FIG. 2. The cooler 216 may further be configured to provide cooler flow 224 to the lube circuit.

FIG. 2 is only one embodiment of a transmission system. There may be other components or systems that form part of embodiments different from the one shown in FIG. 2. The teachings of this disclosure is not intended to be limited to any particular embodiment.

The present disclosure provides an electro-hydraulic control system for controlling a multispeed transmission. The multispeed transmission may include a plurality of forward and reverse speed ratios. Moreover, the multispeed transmission may include an input, an output, a plurality of planetary gearsets, and a plurality of torque-transmitting mechanisms which are selectively engageable to achieve the plurality of forward and reverse speed ratios. In one example, the multispeed transmission may be a nine-speed transmission with an input, an output, a first planetary gearset, a second planetary gearset, and third planetary gearset, and a fourth planetary gearset. Each planetary gearset may be disposed between the input and the output, and each planetary gearset may include a sun gear, a ring gear, and a carrier member. Further, in this example, the transmission may include a plurality of interconnecting members for coupling the planetary gearsets and the torque-transmitting mechanisms to one another and the input and output. One non-limiting example of a multispeed transmission architecture that may be controlled by the teachings of this disclosure is disclosed in U.S. Pat. No. 7,364,527, issued on Apr. 29, 2008 and assigned to General Motors Corporation, the disclosure of which is hereby incorporated by reference.

Referring to FIGS. 3-17, an electro-hydraulic control system 300 is shown for a multispeed transmission in a plurality of ranges including at least one neutral and one reverse range. The electro-hydraulic control system 300 may be similarly situated as the electro-hydraulic system 138 of FIG. 1. In particular, the electro-hydraulic control system 300 may be in electrical communication with a controller such as a transmission control circuit 142 illustrated in FIG. 1. Moreover, the electro-hydraulic control system 300 may include a plurality of fluid paths (e.g., fluid paths 140₁-140ⱼ) for fluidly coupling to a planetary gear system 122 such as the one shown in FIG. 1. In other embodiments, the control system 300 may be electrically or fluidly coupled to other systems or subsystems of a multispeed transmission system.

The electro-hydraulic control system 300 may include a plurality of valves and solenoids for controlling the selective engagement of one or more clutches or brakes. Each clutch or brake may be referred to as a torque-transmitting mechanism for purposes of this disclosure. In addition, and as will be described below, the system 300 may include pressure switches for detecting pressure within a certain circuit or fluid path in the system 300. Other mechanisms will be described in this disclosure. It is worth noting that FIGS. 3-17 illustrate only one embodiment of an electro-hydraulic control system for a multispeed transmission. This disclosure, however, is not intended to be limited to only this embodiment.

Figure 3:
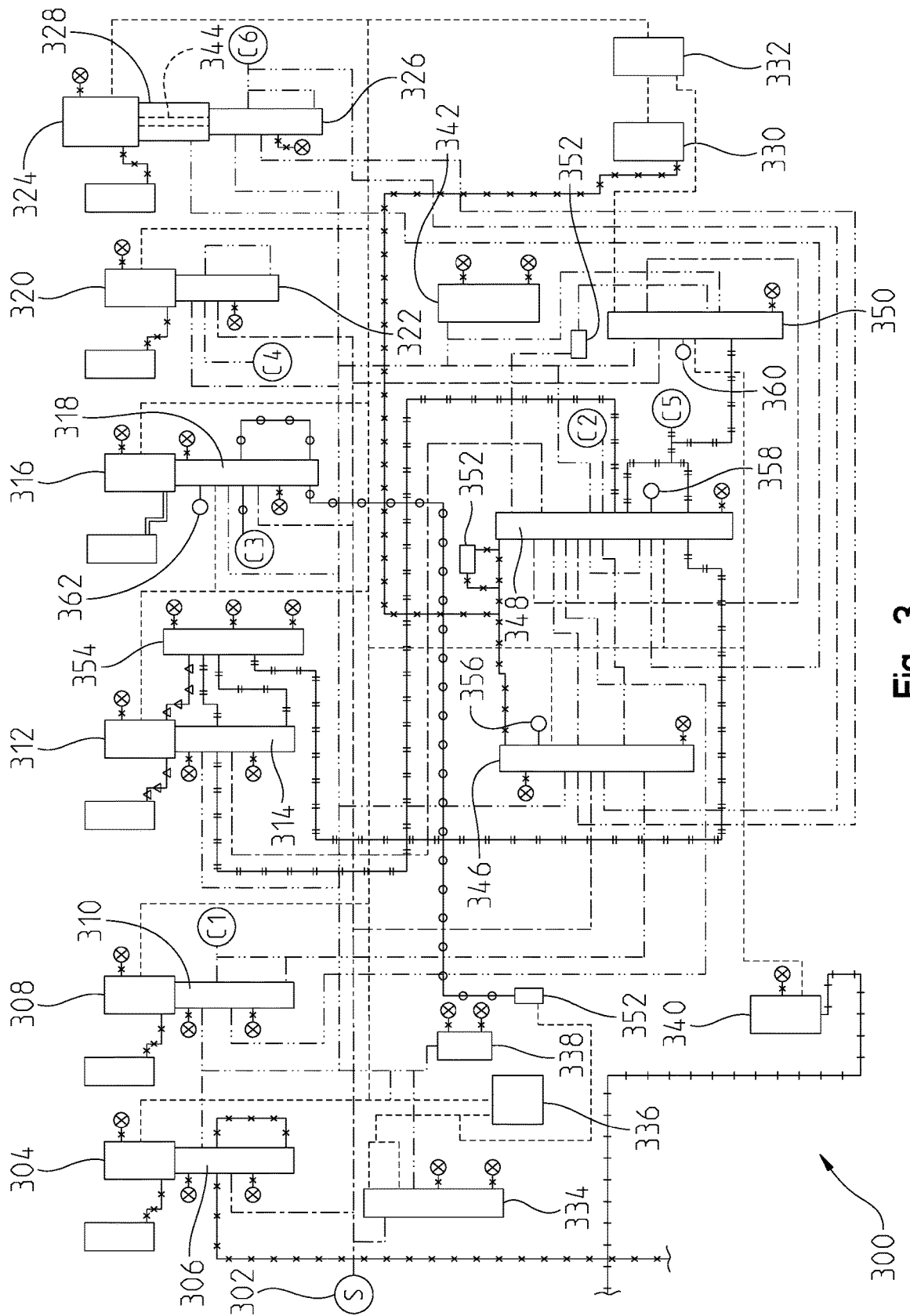
FIG. 3 is a hydraulic control schematic of the system of FIG. 2 in reverse.
Figure 23:
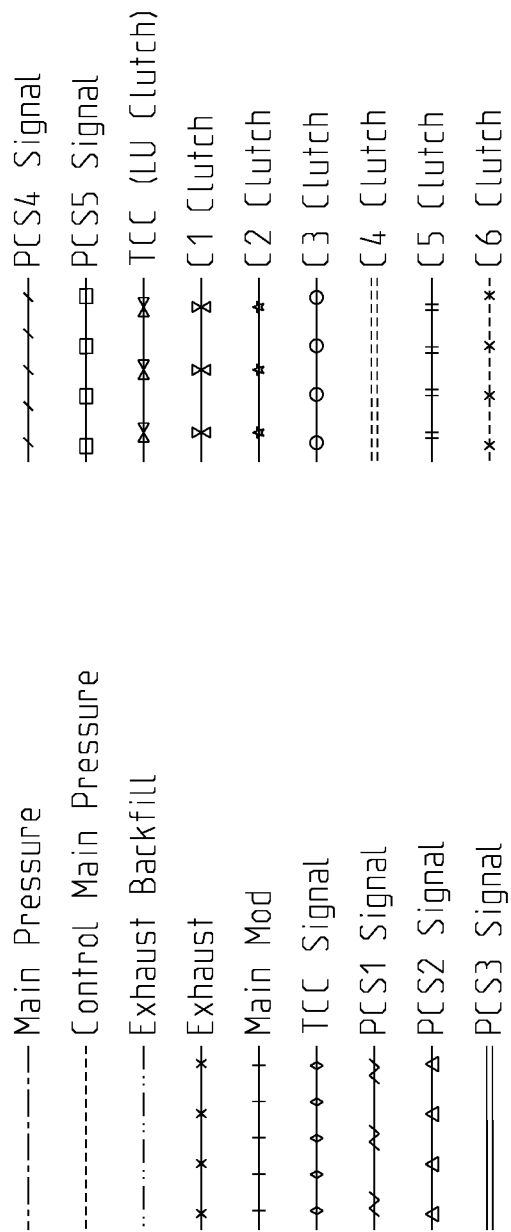
FIG. 23 is a legend of the different fluid circuits or paths in the hydraulic control schematics of FIGS. 3-17.

Turning specifically to FIG. 3, the electro-hydraulic control system 300 may be in fluid communication with the transmission system 200 of FIG. 2. In particular, a fluid source 302 to the control system 300 may be fluidly coupled to the pump 204 via the main regulator 208 and the main pressure circuit 218. Hydraulic fluid may be supplied from the pump 204 to the control system 300 and regulated by the main regulator 208. As such, fluid from the pressure source 302 may be referred to as main pressure. The various fluid pressures and fluid lines in the electro-hydraulic control system 300 are identified in a legend shown in FIG. 23 of this disclosure. These fluid pressures include main pressure, control main pressure, exhaust backfill pressure, exhaust pressure, main modulated pressure, torque converter lockup clutch signal pressure, torque converter lockup clutch pressure, pressure control solenoid signal pressures, and clutch pressures. In other embodiments, there may be additional or fewer signal pressures or fluid pressures in a control system, and the illustrative embodiments of the present disclosure are not intended to be limiting in this manner.

Figure 6:
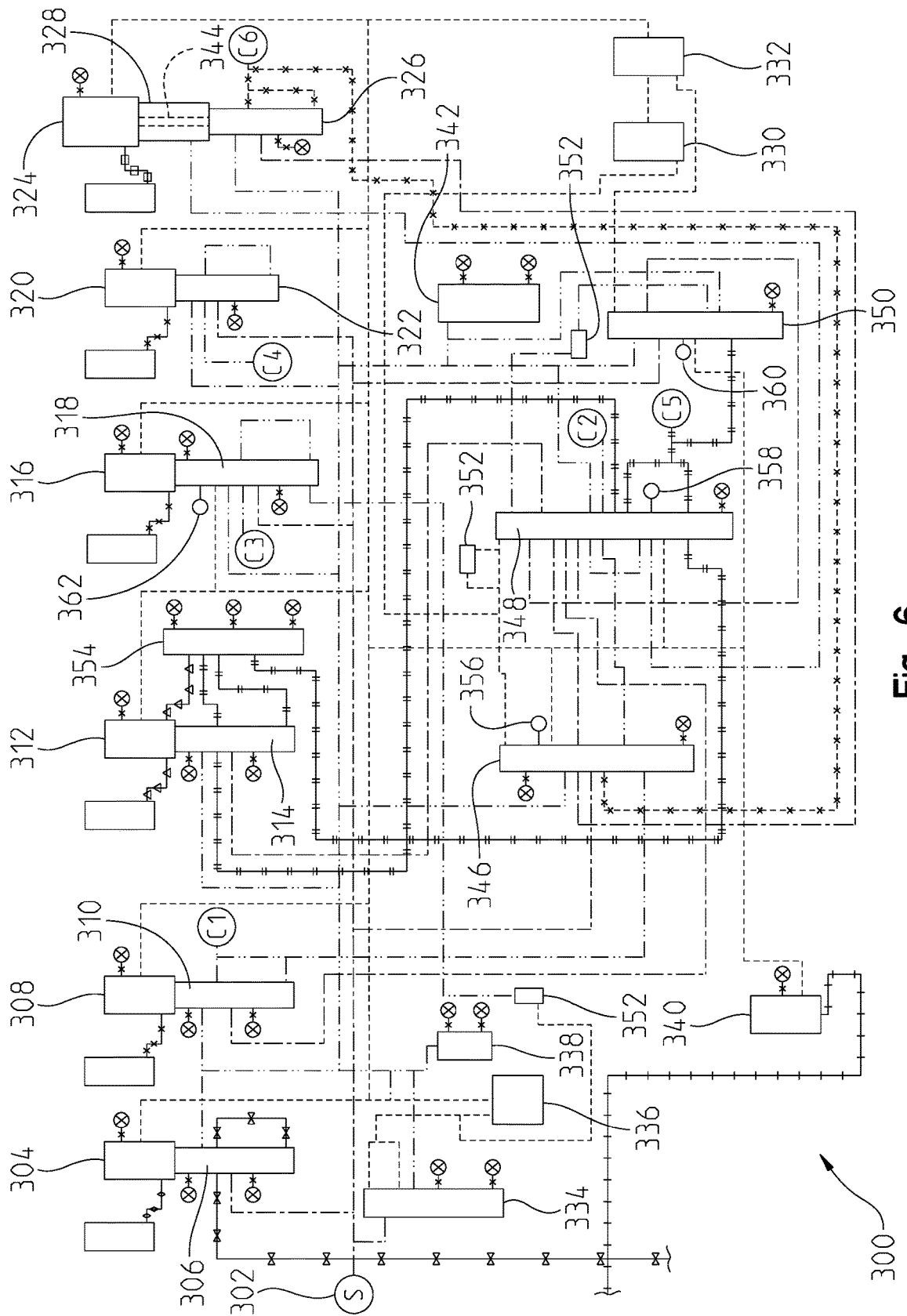
FIG. 6 is another embodiment of a hydraulic control schematic of the system of FIG. 2 in first range.

Referring to FIG. 3, the electro-hydraulic control system 300 may include a plurality of trim systems, with each trim system including a solenoid and a trim valve. For example, a first trim system may include a torque converter clutch trim solenoid 304 (i.e., TCC solenoid) and a torque converter clutch trim valve 306. Also shown adjacent to the TCC trim solenoid 304 but not labeled is an accumulator (to the left of the solenoid 304 in FIG. 3). Activation of the TCC trim system may provide hydraulic fluid through a TCC flow path to the converter flow 214. The fluid may flow from the converter flow 214 to apply the lockup clutch of the torque converter 202 via the converter in flow path 222. This is best shown in FIGS. 2 and 6.

Each of the trim systems depicted in FIGS. 3-17 include an accumulator, although in other embodiments there may not be an accumulator for each trim system. The accumulator is a small valve that strokes according to an output pressure of the solenoid. When it strokes or de-strokes, there is a volume of fluid that comes from the solenoid output or flows back through the solenoid. The accumulator may be any conventional mechanism for providing a more stable controls system.

A second trim system includes a first pressure control solenoid 308 and a first pressure control trim valve 310. The trim system may include an accumulator as shown in FIG. 3. The first pressure control solenoid 308 may be referred to as a normally-high pressure control solenoid. For purposes of this disclosure, a normally-high pressure control solenoid outputs full pressure when there is no current being supplied to the solenoid. In other words, if electrical power is lost or disconnected to the first pressure control solenoid 308, its default position is to output full pressure to stroke the first pressure control trim valve 310.

As also shown, hydraulic fluid may flow through the second trim system to apply a first torque-transmitting mechanism, C1. C1 may be either a clutch or a brake. In FIG. 3, C1 is unapplied and hydraulic fluid is exhausted to backfill as shown. Exhaust backfill and exhaust may simply refer to hydraulic fluid being released or returned to the reservoir 206.

Another trim system in FIG. 3 includes a second pressure control solenoid 312 and a second pressure control trim valve 314. Similar to the first pressure control solenoid 308, the second pressure control solenoid 312 may be a normally-high pressure control solenoid. Thus, if electrical power is lost or disconnected to the second pressure control solenoid 312, it defaults to full output pressure to stroke the second pressure control trim valve 314.

A further trim system in the control system 300 includes a third pressure control solenoid 316 and a third pressure control trim valve 318. Similar to the first and second trim solenoids, the third pressure control solenoid 316 may be a normally-high pressure control solenoid. Thus, if electrical power is lost or disconnected to the third pressure control solenoid 316, it defaults to full output pressure to stroke the third pressure control trim valve 318. Moreover, when the third pressure control trim valve 318 is stroked, hydraulic fluid is able to flow and apply a third torque-transmitting mechanism, C3. Similar to C1, C3 may be a clutch or brake.

The electro-hydraulic control system 300 further includes a trim system formed by a fourth pressure control solenoid 320 and a fourth pressure control trim valve 322. The fourth pressure control solenoid 320 may be a normally-low pressure control solenoid. Thus, unlike the normally-high pressure control solenoids, the normally-low pressure control solenoids produce zero output pressure when there is no current supplied to the solenoid. If the fourth pressure control solenoid 320 is actuated or energized by a transmission controller or control circuit, and electrical power is lost, the fourth pressure control solenoid 320 defaults to zero output pressure and the fourth pressure control trim valve 322 de-strokes.

This trim system may also control fluid pressure to a fourth torque-transmission mechanism, C4. C4 may be a clutch or a brake. When the fourth pressure control trim valve 322, or simply the fourth trim valve, moves to its stroked position, fluid pressure may fill and apply C4. However, when electrical power is lost, the fourth pressure control solenoid 320 de-energizes and the fourth trim valve 322 de-strokes thus blocking hydraulic fluid from applying C4. This will be further described below.

Another trim system in the control system 300 includes a fifth pressure control solenoid 324 and a fifth pressure control trim valve 326. In this embodiment, the fifth pressure control solenoid 324 is another normally-low pressure control solenoid that defaults to zero output pressure when electrical current is no longer supplied to the solenoid. As such, the fifth pressure control trim valve 326, or simply fifth trim valve 326, de-strokes when electrical power is lost.

As shown in FIG. 3, the fifth pressure control solenoid 324 and fifth trim valve 326 may control hydraulic fluid to apply a sixth torque-transmitting mechanism, C6. C6 may be a clutch or brake. When the fifth trim valve 326 is stroked, fluid may fill and apply C6. When the valve is de-stroked, C6 may be unapplied. Another feature of this trim system in the inclusion of a boost plug 328. The boost plug 328 may include a hollow opening or channel 344 defined therein for fluid to pass through the plug 328 and move the fifth trim valve 326. As will be described below, the boost plug 328 allows for a different gain to be realized by this trim system.

The control system 300 may further include a second torque-transmitting mechanism, C2, and a fifth torque-transmitting mechanism, C5. C2 and C5 may be either a clutch or a brake. Hydraulic fluid for applying either C2 or C5 may flow through fluid passages defined by a relative position of the second trim valve 314.

The electro-hydraulic control system 300 of FIG. 3 further illustrates a pair of on-off shift solenoids 330, 332. Each solenoid may be energized or de-energized by the controller, e.g., the transmission controller or transmission control circuit 142. When the solenoid is energized, i.e., it is considered "on", the solenoid is capable of outputting a control pressure. When the solenoid is de-energized, i.e., it is referred to as being "off," the solenoid does not output any control pressure.

In this disclosure, control pressure is a pressure that is fed from the main pressure circuit 218 or pressure source 302 but it is regulated at a maximum pressure that is generally lower than main pressure. Moreover, control pressure, i.e., "control main pressure", is referred to as a feed pressure to all actuators. The control pressure may be regulated, for example, at 110 psi. This is only one example as control pressure may be regulated at a different pressure for other embodiments. By contrast, main pressure may exceed control pressure based on a particular torque requirement of the transmission. For example, in one embodiment, main pressure may vary between 50-250 psi, whereas control pressure may be limited at a regulated pressure (e.g., 110 psi).

Control pressure may be used to control the solenoids in the control system 300 so that the maximum output pressure of the solenoids is control pressure. To achieve control pressure, main pressure is supplied from the pressure source 302 into a control main valve 334. Hydraulic fluid flowing out of the control main valve 334 is the control pressure, which then flows through a control main filter 336 to remove any debris or unwanted particulates in the fluid. Control pressure then flows to each of the aforementioned pressure control solenoids and the on/off solenoids. Control pressure may also be fed through the different actuators or shift valves, which will be described below. Moreover, control pressure pressurizes pressure switches in the control system 300.

Another mechanism for reducing or otherwise regulating main pressure is a main modulated solenoid 340. The main modulated solenoid 340 outputs a reduced main pressure, and the solenoid may be energized and de-energized via the controller. Although not shown in FIG. 3, modulated main pressure from the main modulated solenoid 340 may flow to the main regulator 208 in FIG. 2 to increase or decrease main pressure based on solenoid output.

The control system 300 includes a plurality of different valves including an exhaust backfill relief valve 338 and an exhaust backfill valve 342. In each case, fluid that pressurizes either valve may be exhausted to the reservoir 206. Another type of valve in the control system 300 is a check valve 352. In FIG. 3, there are several check valves 352 illustrated in various paths to restrict or prevent flow in a certain direction of the flow path. The check valve 352 may be any conventional check valve for purposes of this disclosure.

The control system 300 further includes a plurality of shift valves or actuators. The shift valves may function differently from the trim valves. The aforementioned trim valves, for example, may be used for modulating pressure to a desired clutch pressure. Here, main pressure may be trimmed to a desirable clutch or trim pressure. On the other hand, the shift valves transition or redirect hydraulic fluid from one flow path to a different flow path.

In the illustrated embodiment of FIGS. 3-17, the control system 300 may include a first shift valve 346, a second shift valve 348, and a third shift valve 350. The function of each shift valve will be described below, particularly with respect to each range and fault range. The second shift valve 348, however, may directly feed clutch pressure to the second torque-transmitting mechanism, C2, and the fifth torque-transmitting mechanism, C5. In this control system 300, only one of C2 and C5 is applied for a given range.

Each of the shift valves may move between a stroked position and a de-stroked position. To do so, the first shift solenoid 330 may be configured to actuate the first and second shift valves, and the second shift solenoid 332 may be configured to actuate the third shift valve 350. The manner in which each shift valve is actuated in a given range will be further described below.

Another valve shown in the control system 300 of FIG. 3 includes a boost valve 354. The boost valve 354 and second trim valve 314 may control hydraulic fluid to C2 and C5, which will be described below.

The control system 300 further includes a first pressure switch 356, a second pressure switch 358, a third pressure switch 360, and a fourth pressure switch 362. Each pressure switch may be actuated between a first position and a second position. In the first position, the pressure switch is pressurized, and in the second position the pressure switch is not pressurized. Based on the position, the controller can detect different valve positions and gains throughout the control system 300.

Figure 21:
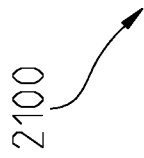
FIG. 21 is one embodiment of a mechanization table of the multispeed transmission system of FIG. 2.

In the present disclosure, the control system 300 is such that two torque-transmitting mechanisms are applied. Referring to FIG. 21, for example, a mechanization table 2100 of a multispeed transmission is provided. In this table 2100, a plurality of forward ranges, neutral and a reverse range are shown. In this embodiment, there are nine forward ranges, but there may be a different number of forward and reverse ranges for other embodiments. This disclosure is not limited to any number of forward and reverse ranges.

The columns of the mechanization table 2100 of FIG. 21 further illustrate the different solenoids. As shown, the shift solenoids 330, 332 are shown as normally-low solenoids ("N/L") as well as the fourth pressure control solenoid 320 and the fifth pressure control solenoid 324. The first pressure control solenoid 308, the second pressure control solenoid 312, and the third pressure control solenoid 316 are shown as normally-high solenoids ("N/L") in the table 2100. In the table, a zero ("0") identifies as the solenoid as being off or not receiving current, whereas a one ("1") indicates the solenoid as being on or receiving current (i.e., energized). The pressure control solenoids indicate which clutch is available in each range for being applied. The following table illustrates one embodiment in which at least two torque-transmitting mechanisms are engaged or applied:

| Steady State Range | Engaged Torque-Transmitting Mechanism | Engaged Torque-Transmitting Mechanism |
| --- | --- | --- |
| Reverse | C5 | C3 |
| Neutral | C5 | — |
| 1st | C5 | C6 |
| 2nd | C5 | C1 |
| 3rd | C1 | C6 |
| 4th | C1 | C4 |
| 5th | C1 | C3 |
| 6th | C1 | C2 |
| 7th | C2 | C3 |
| 8th | C2 | C4 |
| 9th | C2 | C6 |

The mechanization table 2100, however, illustrates other clutches that may be available for any given range. For example, in 5th range, C1 and C3 are applied to achieve this range. However, C4 and C6 are also available if the requisite trim system was triggered to allow fluid to flow to the respective clutch. For instance, if the fifth pressure control solenoid 324 is energized in fifth range, the fifth trim valve 326 may be stroked to allow pressure to fill and apply C6. Thus, the mechanization table 2100 illustrates the clutches that are applied and also the clutches that may be available depending upon the position of a valve or state of a solenoid. This is further described with respect to hydraulic default ranges below.

In the mechanization table 2100 of FIG. 21, it is noted that the first pressure control solenoid 308 may control C1 between an applied and unapplied state, the second pressure control solenoid 312 may control either C2 or C5, as discussed above, between an applied and unapplied state, and the third pressure control solenoid 316 may control C3 between an applied and unapplied state. Each of these three solenoids is a normally-high solenoid, and thus if electrical power is lost and no current is sent to these solenoids, each solenoid still outputs full pressure to the respective trim valve. If hydraulic pressure is received at the respective trim valve, then with the solenoid outputting full pressure, the respective clutch or brake (C1, C2/C5, and C3) may be applied.

Moreover, the table 2100 further illustrates that the fourth pressure control solenoid 320 may control C4 between an applied and unapplied state, and the fifth pressure control solenoid 324 may control C6 between an applied and unapplied state. Both of these two solenoids, however, are normally-low solenoids and therefore output zero pressure when the solenoid receives no current. In this embodiment, if power is lost and either C4 or C6 is applied, the respective pressure control solenoid discontinues sending pressure to the respective trim valve and the clutch or brake is unapplied. Thus, with respect to C4 and C6, both torque-transmitting mechanisms may be triggered from their applied to unapplied state if electrical power is lost and no current is sent to their respective pressure control solenoid.

It is further shown in the mechanization table 2100 of FIG. 21 the different hydraulic default ranges for each of the forward, neutral and reverse ranges. In the control system 300 of FIG. 3, and the multispeed transmission to which the control system 300 controls, there are a combination of two clutches or brakes applied per range, except for neutral. In neutral, only one clutch or brake is applied. However, the table 2100 identifies other clutches or brakes that may be applied. For example, in 1st range, C5 and C6 are normally applied. In the table, however, it is further shown that torque-transmitting mechanisms C1, C3, and C4 are available to be applied if the controller operably energizes or de-energizes the necessary solenoids. The same may be true for other ranges, such as 8th range where C2 and C4 are applied but C3 and C6 are available if the controller energizes the third and fifth pressure control solenoids.

As shown in the table, the control system 300 includes a neutral default range, a low default range (i.e., $5^{th}$ range) and a high default range (i.e., $7^{th}$ range). In neutral, the control system 300 may be optimally setup such that if electrical power is lost, C5 is unapplied and C3 is applied to achieve a C3N default range (i.e., C3 neutral). As discussed above, C3 is controlled by the third pressure control solenoid 316, and when electrical power is lost, the third pressure control solenoid 316 still outputs full pressure to stroke the third trim valve 318 and allow hydraulic pressure at the trim valve to fill and apply C3. This will be further described with respect to FIGS. 15-17. The manner in which the low and high default ranges are achieved will also be described below with respect to FIGS. 15-17. For purposes of this disclosure, however, the control system 300 is capable of defaulting into three different conditions or ranges if power is lost, and each condition or range is better able to protect the transmission from being damaged.

Figure 17:
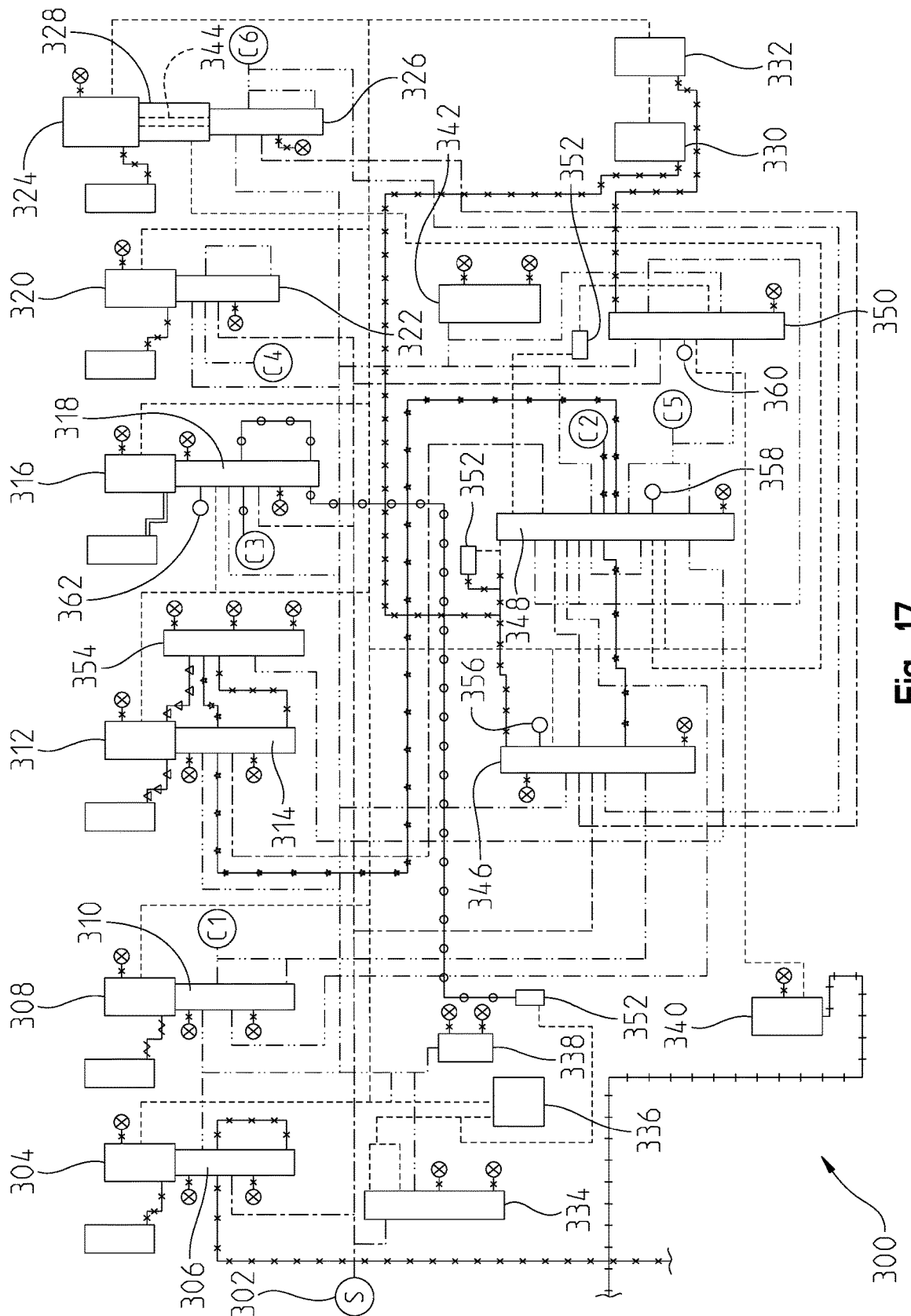
FIG. 17 is a hydraulic control schematic of the system of FIG. 2 in a third power-off range.
Figure 18:
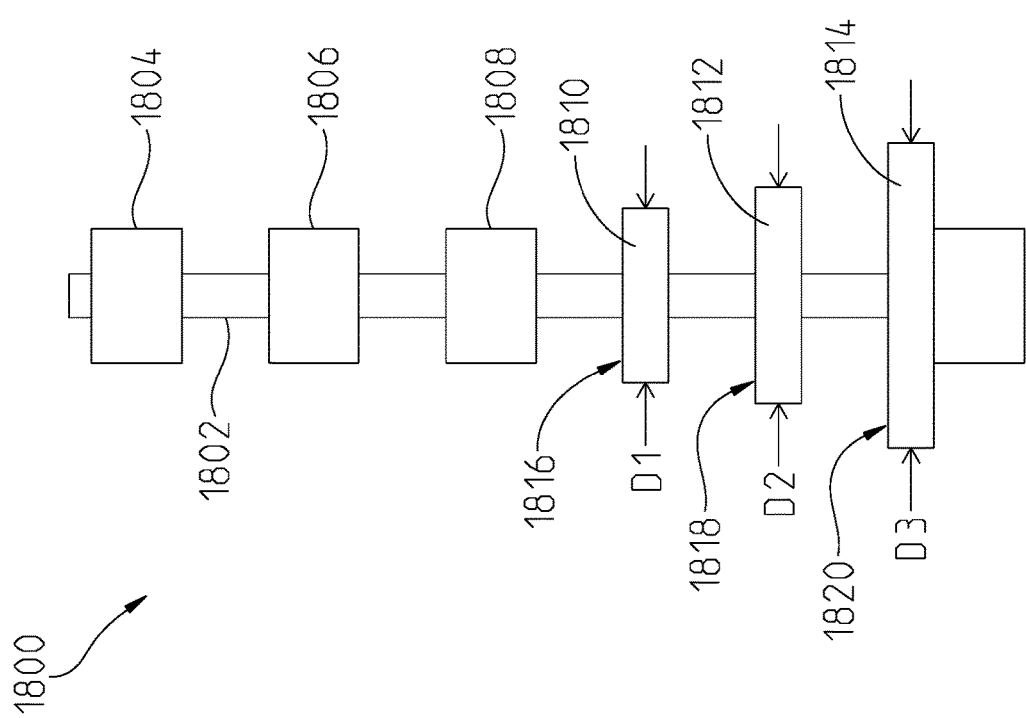
FIG. 18 is one embodiment of a schematic of a first shift valve.

In the control schematics of FIGS. 3-17, the trim valves and shift valves are shown without much detail, i.e., with respect to length and diameter. Referring to FIG. 18, one non-limiting example of a valve 1800 is shown. In this example, the valve 1800 may be an example of the first shift valve 346. Here, the valve 1800 has an overall length with different portions and diameters (or widths). The valve 1800 may include a stem or body 1802. Moreover, along the length of the valve 1800, there is a first valve portion 1804, a second valve portion 1806, a third valve portion 1808, a fourth valve portion 1810, a fifth valve portion 1812, and a sixth valve portion 1814. In this example, the fourth valve portion 1810 has a diameter, D1, which is greater than the diameter of the first, second and third portions. Further, the fifth valve portion 1812 has a diameter, D2, which is greater than D1, and therefore the fifth valve portion 1812 has a greater diameter than the first, second, third, and fourth valve portions. Yet further, the sixth valve portion 1814 has an overall diameter, D3, that is greater than diameters D1 and D2. As such, the sixth valve portion D3 is the largest diameter of the valve 1800.

In FIG. 18, the valve 1800 is also shown as including three interlocks or latch locations. An interlock or latch may refer to hydraulically holding a valve in position regardless of solenoid pressure. Thus, so long as hydraulic pressure is available at the interlock or latch, the valve is unable to move. This is particularly relevant with the shift valves. Although not shown in this disclosure, each shift valve may be disposed within a pocket of a valve body or the like along with a return spring. The spring may have a spring force that counteracts against the shift valve stroking from its de-stroked position to its stroked position. With a latch or interlock, however, sufficient hydraulic pressure may act against a valve portion to hold the valve in place even if the solenoid pressure at the head of the valve is removed. In FIG. 18, a first interlock 1816 is shown on the fourth valve portion 1810, a second interlock 1818 is shown on the fifth valve portion 1812, and a third interlock 1820 is shown on the sixth valve portion 1814. Thus, on the first shift valve 346, there may be three interlocks.

With respect to the interlocks, the first shift valve may be referred to as the range valve. During operation, hydraulic fluid acting on one of the interlocks may allow the range valve to stay in a certain range. This is also true for neutral. Moreover, the interlocks on the first shift valve allow for the control system to default to the necessary default ranges as shown in FIG. 21.

The interlocks are based on a force balance along the valve. If hydraulic pressure is acting against the first interlock 1816, and more particularly against diameter D1, this pressure may be greater than the spring force counteracting the hydraulic pressure. The force may be determined based on a conventional means, i.e., the amount of pressure multiplied by the area of the valve portion. With respect to the first shift valve 346, the interlocks may maintain the valve in its stroked position based on which torque-transmitting mechanism is engaged. In fifth range, for example, there may not be any control pressure from the first shift solenoid, which under certain circumstances would de-stroke the first shift valve 346. However, hydraulic pressure acting on the third interlock 1820 may keep the valve stroked and allow clutch pressure to fill and apply C1. This is only one of several examples of the interlock keeping a shift valve in a desired position for a particular range. In another example, C2 is applied and hydraulic pressure flows to the first shift valve 346 and may act on the second interlock 1818 to maintain the valve in its stroked position.

Figure 19:
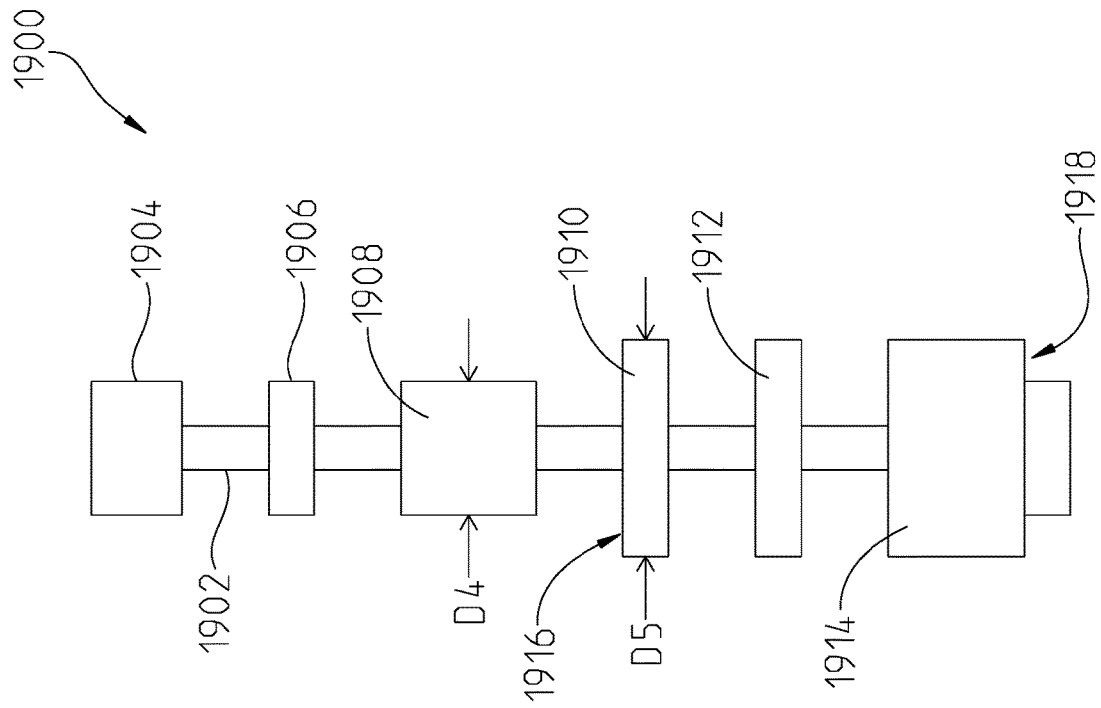
FIG. 19 is one embodiment of a schematic of a second shift valve.

Referring to FIG. 19, one example of the second shift valve 348 is shown. Here, a valve 1900 representative of the second shift valve 348 may include a length partially defined by a valve stem or body 1902, a first valve portion 1904, a second valve portion 1906, a third valve portion 1908, a fourth valve portion 1910, a fifth valve portion 1912, and a sixth valve portion 1914. A shown in FIG. 19, the first, second and third valve portions may include a diameter, D4, whereas the fourth, fifth, and sixth valve portions may include a diameter, D5. Here, D5 is greater than D4, thereby forming or defining an interlock 1916 on the larger valve portions. In addition, at one end of the valve 1900 is a second interlock 1918. The second interlock 1918 may maintain the second shift valve 348 in a de-stroked position via clutch pressure for C5. Thus, even if control pressure is provided at the opposite end of the second shift valve 348 via the first shift solenoid 330, hydraulic pressure at the second interlock 1918 may be enough to keep the valve from stroking.

With respect to the first interlock 1916 on the valve 1900, this may be useful when operating in a higher range (e.g., $6^{th}$-$9^{th}$ ranges) and C2 is applied. As previously noted, the second shift valve 348 can dictate whether C2 or C5 is applied. In other words, this shift valve multiplexes, which will be described below. In $7^{th}$ range (FIG. 12), however, the first shift solenoid 330 may supply control pressure to one end of the second shift valve 348 to move it to its stroked position. Hydraulic pressure that fills and applies C2 may also flow inbetween the third valve portion 1908 and fourth valve portion 1910, and due to the first interlock 1916, the second shift valve 348 may be hydraulically held in place regardless of whether the first shift solenoid 330 sends control pressure or not. This again is due to hydraulic pressure acting on a differential area of the valve 1900 due to a force balance across the valve. Thus, the interlocks are useful for establishing the default ranges (FIGS. 15-17), which will be further addressed below.

As described above, the second shift valve 348 may multiplex. First, however, in the control system 300 of FIG. 3, each clutch or brake has something to hydraulically fill and apply it. For C1, C3, C4, and C6, there is a trim system for filling and applying each torque-transmitting mechanism. In a multiplex system, a single trim system is used to hydraulically apply more than one torque-transmitting mechanism. With respect to C2 and C5, the second shift valve 348, the second pressure control solenoid 312, the second trim valve 314, and the boost valve 354 may be used for hydraulic control. In one example, if the second shift valve 348 is de-stroked (i.e., stroked up), C5 may be hydraulically controlled (i.e., reverse, neutral, $1^{st}$ and $2^{nd}$ ranges). On the other hand, if the second shift valve 348 is stroked (i.e., stroked down), C2 may be hydraulically controlled (i.e., $6^{th}$-$9^{th}$ ranges). Thus, if hydraulic pressure is available at the second shift valve, then either C2 or C5 may be hydraulically applied based on a position of the shift valve.

With the second shift valve 348 functioning as a multiplex system, less hardware (such as a trim solenoid and trim valve) is necessary for the control system. Moreover, the multiplex system effectively "locks out" or prevents both C2 and C5 from applying at the same time. This may be important, for example, to protect the integrity of the transmission from potential damage due to a locked output. In a higher speed when C2 is applied, there may be potential damage to the transmission if C5 is applied at the same time. Thus, the second shift valve 348 may allow only either C2 or C5 to hydraulically apply, but not the other.

Referring now to FIG. 20, a representative valve 2000 for the third shift valve 350 is shown. The valve 2000 is only one example of the third shift valve 350, as it may differ in other examples. In FIG. 20, however, the valve 2000 may include a length defined by a valve stem or body 2002, a first valve portion 2004, a second valve portion 2006, a third valve 2008, a fourth valve portion 2010, and a fifth valve portion 2012. In this example, each valve portion has the same diameter or width. Thus, there are no interlocks or latches formed with this valve 2000. However, in other embodiments, one or more of the valve portions may have a different diameter or width to form an interlock or latch.

Figure 12:
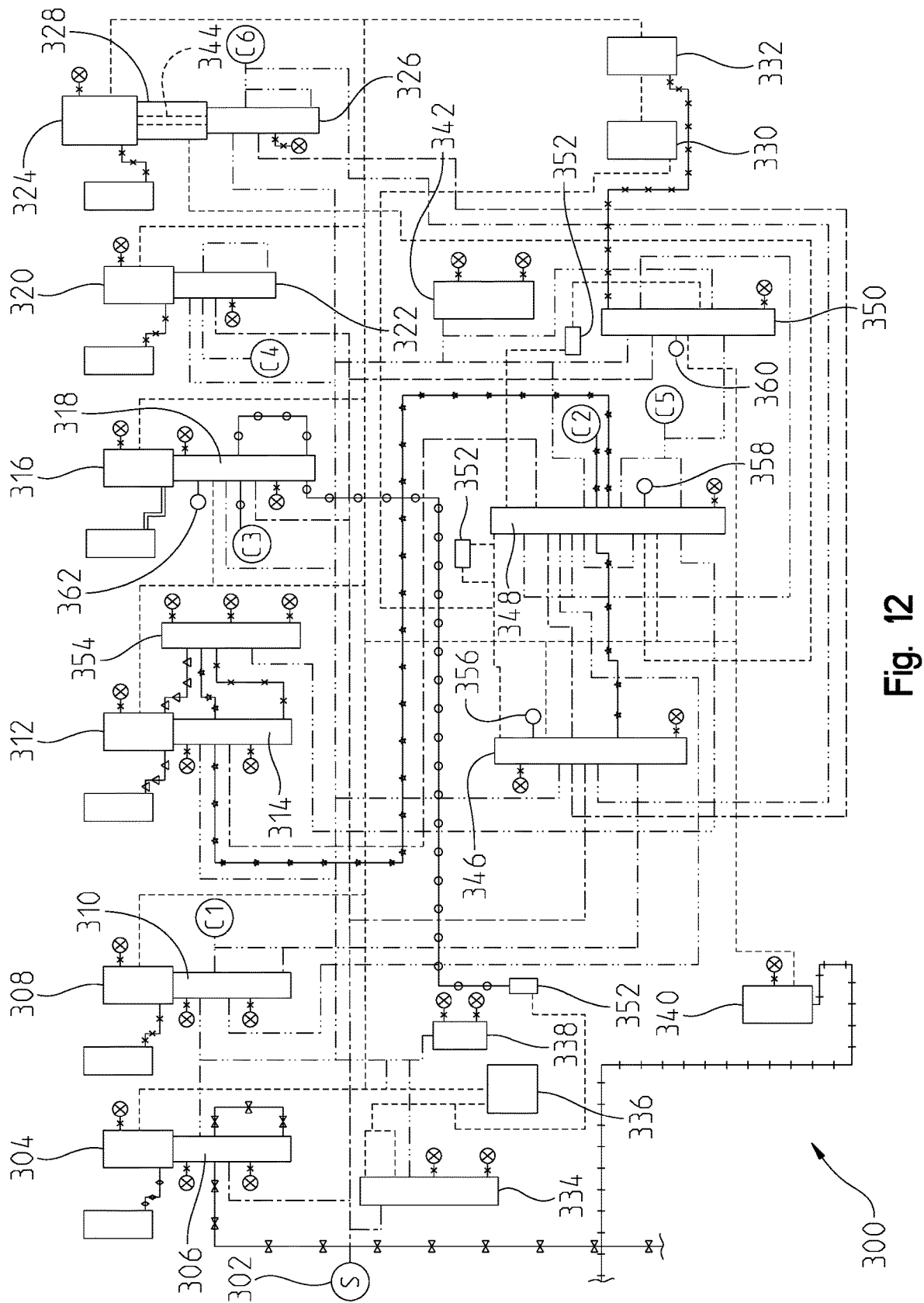
FIG. 12 is a hydraulic control schematic of the system of FIG. 2 in seventh range.

In this disclosure, the third shift valve 350 may be referred to as a power valve. The power valve is able to block hydraulic pressure from applying C1. It does so be effectively blocking a main pressure feed to the first pressure control trim system, e.g., the first trim valve 310. In $7^{th}$ range, for example, the third shift valve 350 is able to block main pressure from reaching the first trim valve 310 (FIG. 12). In FIG. 12, main pressure is supplied by the pressure source 302 and it can flow to the third shift valve 350. As noted above, the third shift valve 350 may not include any interlocks or latches, and therefore its position may be controlled by control pressure from the second shift solenoid 332. In FIG. 12, however, the second shift solenoid 332 may be de-energized such that it does not output any control pressure. Without any control pressure acting against the third shift valve 350, the third shift valve 350 may be de-stroked. In its de-stroked position, main pressure from the pressure source 302 is blocked (e.g., by the second valve portion 2006). Thus, from FIG. 12 and in $7^{th}$ range, C1 is not applied due to the third shift valve 350 blocking pressure from reaching the first trim valve 310. The same may be true in $8^{th}$ and $9^{th}$ ranges as well.

The third shift valve 350 is also able to block hydraulic fluid from flowing to the second trim system, i.e., the second trim valve 314. Moreover, the third shift valve 350 effectively blocks flow from reaching the second shift valve 348 as well. However, in $7^{th}$ range, for example, the interlock on the second shift valve 348 maintains the valve in a position which fills and applies C2. As will be discussed below, the second shift valve 348 and the third shift valve 350 also may be controlled such that hydraulic pressure is not fed to all three of the trim valves actuated by the normally-high solenoids. If clutch pressure was fed to all three trim valves, then C1, C3 and one of C2 or C5 would apply thereby possibly causing damage to the transmission. The control system 300 therefore controls the position and movement of the second and third shift valves to block flow from one or more of the trim valves to prevent this from happening.

Another feature of this disclosure is the control of the range valve, i.e., the first shift valve 346. The range valve may be operably controlled via a shift-by-wire control system. In other words, a vehicle operator may push a button, turn a knob, trigger a switch or some other operation to send an instruction to the controller to select a range of the transmission system. In turn, the controller may energize one or more solenoids to electrically actuate the control system 300 to a desired range. Thus, in the shift-by-wire control system, there is no manual linkage for controlling a detent or the like for manually controlling the transmission system to a certain range. In this disclosure, the controller therefore can control the position of the range valve (i.e., first shift valve 346) in order to select a range or shift to a different range.

In an alternative embodiment, the range valve may be replaced by a three position manual valve that is manually actuated by a shift linkage. In other words, a cable or other linkage may be installed for manually controlling the transmission into range.

Turning now to the specifics of FIG. 3, the control system 300 is shown operating in reverse. In other words, the controller has received a command from an operator to control the transmission in reverse via a shift-by-wire system, or an operator has controlled a shift linkage to control the transmission in reverse. In any event, main pressure is supplied by the pressure source 302 to the control system 300. As shown in FIG. 21 and described above, C3 and C5 are engaged in reverse. To achieve this, main pressure is fed to the third trim valve 318 and the controller energizes the third pressure control solenoid 316 to move the third trim valve 318 to its stroked position. In this manner, hydraulic fluid is able to fill and apply C3 in reverse.

For C5, it is first worth noting that the first shift solenoid 330 is de-energized and the second shift solenoid 332 is energized. Thus, the first and second shift valves are in their respective de-stroked positions, and the third shift valve 350 is in its stroked position (i.e., since the second shift solenoid 332 controls the third shift valve 350). With the third shift valve 350 in its stroked position, main pressure is able to flow through the third shift valve 350 and through the second shift valve 348, as shown in FIG. 3. As main pressure flows through the second shift valve 348, it flows directly to the second trim valve 314. The controller may energize the second pressure control solenoid 312 in order to move the second trim valve 314 to its stroked position, and with main pressure at the second trim valve 314, hydraulic fluid is able to flow through the second trim valve 314 and back through the second shift valve 348 to fill and apply C5.

C5 pressure flows back through second shift valve 348 once it is applied as shown in FIG. 3. In particular, C5 pressure may flow and apply a pressure force against one end of the second shift valve 348 to maintain the valve in its position. In this instance, an interlock may be formed on one end of the second shift valve 348.

C5 pressure also flows back to the boost valve 354 and is able to force or maintain the boost valve 354 in its de-stroked position. The function and use of the boost valve will be described further below.

In reverse, the other torque-transmitting mechanisms are unapplied. First, main pressure flows to the first shift valve 346, but with the first shift valve 346 de-stroked, main pressure is effectively blocked by the first shift valve 346. The second shift valve 348 also blocks main pressure via one of its valve portions. As a result, there is no main pressure being fed to the first trim valve 310. Regarding C2, as we described previously, the second shift valve 348 multiplexes and allows only one of C2 or C5 to be applied. In reverse, the second shift valve 348 may be in its de-stroked position so that only C5 is applied.

With regards to C4 and C6, the controller is not sending any current to either the fourth pressure control solenoid 320 or the fifth pressure control solenoid 324, and therefore the respective trim valves are de-stroked. With respect to the fourth trim valve 322, it is shown in FIG. 3 that main pressure flows to the fourth trim valve 322. But, with the fourth trim valve 322 de-stroked, main pressure is blocked by the trim valve and unable to fill and apply C4. Moreover, the second shift valve 348 blocks main pressure from feeding the fifth trim valve 326, and if even pressure was fed to the fifth trim valve 326, the fifth pressure control solenoid 324 is de-energized. Thus, the fifth trim valve 326 is de-stroked and no hydraulic fluid can fill and apply C6.

Figure 15:
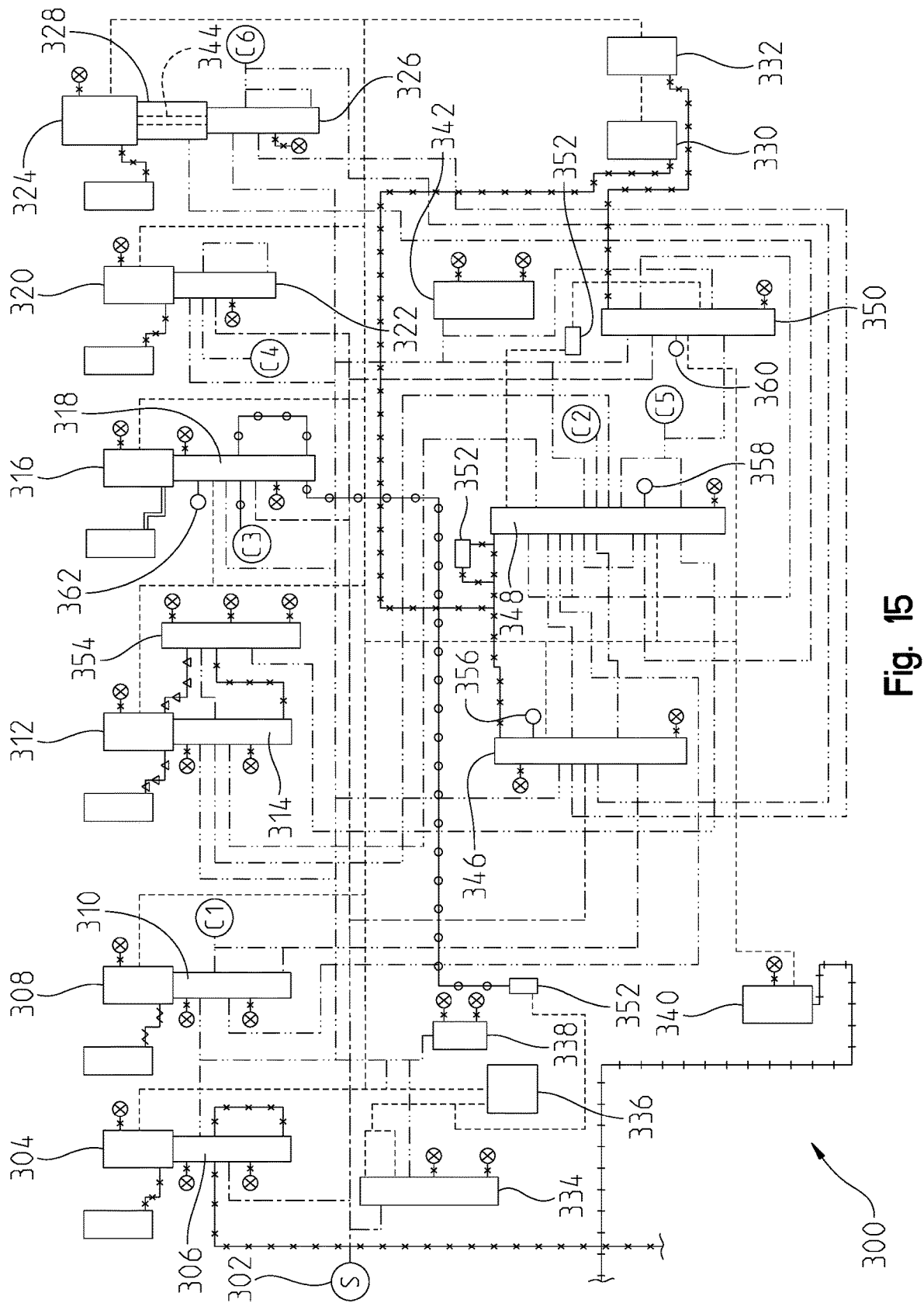
FIG. 15 is a hydraulic control schematic of the system of FIG. 2 in a first power-off range.

With reverse described above and shown in FIG. 3, the control system 300 is further capable of controlling the transmission from reverse to neutral in the event of a power loss to the system. This is shown in FIG. 15. In this embodiment, C3 remains applied and C5 is exhausted. During a power loss event, the normally-low solenoids (i.e., the fourth pressure control solenoid 320 and fifth pressure control solenoid 324) are de-energized and thus neither C4 nor C6 are capable of being filled and applied. Moreover, the first shift solenoid 330 and the second shift solenoid 332 are de-energized and therefore the first shift valve 346, the second shift valve 348, and the third shift valve 350 are de-stroked. Lastly, the normally-high pressure control solenoids 308, 312, and 316 output full pressure during a power-off event.

As shown in FIG. 15, main pressure is supplied from the fluid source 302 to the third trim valve 318, the fourth trim 322, the first shift valve 346, and the third shift valve 350. With the third pressure control solenoid 316 outputting full pressure to the third trim valve 318, hydraulic fluid is able to continue filling and applying C3. Thus, from reverse to default neutral, C3 remains applied. C4 and C6 remain unapplied because they are normally low solenoids. Even though the first and second pressure control solenoids are outputting full pressure to stroke the first trim valve 310 and the second trim valve 314, the first shift valve 346 and the third trim valve 350 are de-stroked and effectively block main pressure from flowing to either trim valve. Further, with the first and third shift valves de-stroked, there is no hydraulic fluid for feeding the second shift valve 348. Without any fluid passing through any of the shift valves or the second trim valve 314, neither C2 nor C5 are filled and applied. Thus, in the power-off event of FIG. 15, only C3 is applied and the transmission defaults to a C3 Neutral state.

During the power-off event from reverse to C3 Neutral, C5 is exhausted. In one embodiment, C5 may be considered a large clutch or brake that requires a substantial amount of fluid to apply it. During cold temperatures, the viscosity of the fluid may be such that the fluid does not exhaust quickly from C5. A first exhaust path for C5 is through the second shift valve 348 and a second exhaust path is through the second trim valve 314. In both cases, the fluid travels a long distance to reach an exhaust outlet (identified in FIGS. 3-17 as a small circle with an X circumscribed). Due to its higher viscosity at low temperatures, it can be difficult to quickly exhaust C5 through either the first or second exhaust paths.

As shown in FIG. 15, however, a third and shorter exhaust path may be provided for more quickly exhaust C5. Here, the third exhaust path is defined from C5 through the third shift valve 350 and to the exhaust backfill valve 342 where fluid is exhausted to the reservoir 206. When C5 is released, hydraulic fluid is able to flow through any of these three fluid paths to exhaust, and the third exhaust path is shorter than the first and second exhaust paths thereby allowing fluid to more quickly exhaust at colder temperatures.

Figure 4:
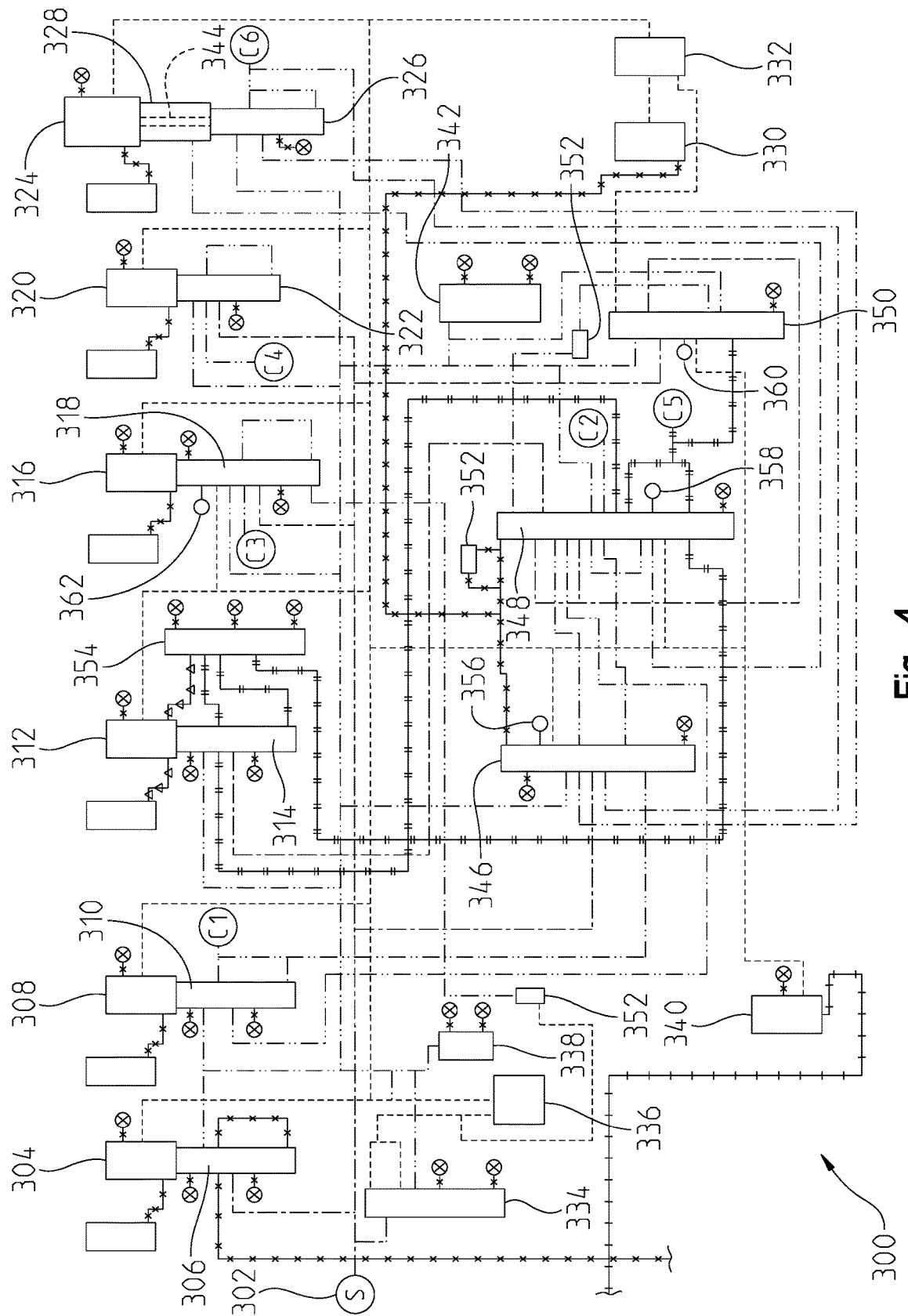
FIG. 4 is a hydraulic control schematic of the system of FIG. 2 in neutral or park.

Referring to FIG. 4, the control system 300 is shown controlling the transmission in neutral or park. In this illustrated embodiment, C5 is engaged and the other torque-transmitting mechanisms are disengaged. To get this arrangement, main pressure continues to be supplied by the pressure source 302. Here, the controller energizes the second pressure control solenoid 312 to move the second trim valve 314 to its stroked position. The other pressure control solenoids are de-energized, and therefore C1, C3, C4 and C6 are disengaged. The first shift solenoid 330 is de-energized, and thus the first shift valve 346 and the second shift valve 348 are de-stroked. The second shift solenoid 332, however, is energized and control main pressure is fed to one end of the third shift valve 350 to move it to its stroked position.

Main pressure is fed to the third trim valve 318 and the fourth trim valve 322, but with each trim valve de-stroked there is no pressure filling either C3 or C4. With the first shift valve 346 de-stroked in FIG. 4, main pressure is blocked by one portion (e.g., the third valve portion 1808) of the first shift valve 346 to prevent hydraulic fluid from being directed to the first trim valve 310. Thus, C1 is unapplied for at least this reason (as well as the first trim valve 310 is de-stroked and would otherwise block the fluid).

With the third shift valve 350 being stroked by the control main pressure being fed by the second shift solenoid 332, main pressure is able to flow through the third shift valve 350 to the second trim valve 314 via the second shift valve 348. In particular, while the second shift valve 348 is de-stroked, hydraulic fluid may be able to flow between the first portion 1904 and the second portion 1906 of the valve. As fluid flows to the second trim valve 314, the second pressure control solenoid 312 is energized by the controller to move the second trim valve 314 to its stroked position. As a result, fluid is able to flow back through the second shift valve 348 and fill and apply C5.

In the event of a power loss, the controller is unable to control any of the solenoids. As a result, when the transmission is in neutral as shown in FIG. 4, the energized second shift valve 332 is de-energized and therefore the third shift valve 350 moves from its stroked position to its de-stroked position. Once the third shift valve 350 moves to its de-stroked position as shown in FIG. 15, main pressure is blocked by the shift valve (e.g., by the second valve portion 2006) and hydraulic fluid no longer flows through the second shift valve 348 to the second trim valve 314. Thus, even though the second pressure control solenoid 312 is a normally-high solenoid and outputs full pressure, there is no hydraulic fluid available to continue filling and applying C5. Thus, C5 exhausts through any or all of its three exhaust paths, as described above.

As shown in FIG. 15, main pressure continues to flow to the third and fourth trim valves. With the third pressure control solenoid 316 outputting full pressure to move the third trim valve 318 to its stroked position, fluid is able to fill and apply C3. The same is not the case with C4, as the fourth pressure control solenoid 320 remains de-energized and the fourth trim valve 322 therefore blocks main pressure from filling C4. As a result, when the transmission is in neutral or park and power is lost, C5 is exhausted and C3 is applied so that the control system 300 defaults to the C3 Neutral state.

One of the features of this default C3 Neutral state is that the range valve, i.e., the first shift valve 346, is in its de-stroked position and blocks fluid from flowing to the first trim valve 308 and the fifth trim valve 326. Moreover, the third shift valve 350 is de-stroked and blocks fluid from flowing to the second trim valve 314. Thus, even though the first pressure control solenoid 308 and the second pressure control solenoid 312 output full pressure to their respective trim valves, the first shift valve 346 is disposed to block the supply of hydraulic fluid to fill C1 and C6, and the third shift valve 350 is disposed to block the supply of hydraulic fluid to fill C5. As a result, the transmission is effectively prevented from shifting into either reverse or a forward range due to the position of the first shift valve 346 and third shift valve 350.

Another aspect of the present disclosure is the ability to detect valve position and default ranges with the pressure switches. With shift valves, it is desirable to be able to detect the position of each shift valve to ensure hydraulic fluid is being directed to the correct path and prevent an unwanted torque-transmitting mechanism from being filled and applied. In the present disclosure, that is further the case with the second shift valve which multiplexes and controls both C2 and C5. Each pressure switch in the control system 300 is capable of being pressurized by control main pressure and moving between a first position and a second position. Each pressure switch is in electrical communication with the controller to provide feedback to the controller based upon the position of the switch. As will be described below, pressure switches are able to communicate additional information to the controller including low or high gain and a position of the boost valve 354.

In the control system 300 of FIGS. 3-17, the first pressure switch 356 is capable of detecting the position of the first shift valve 346, the second pressure switch 358 is capable of detecting the position of the second shift valve 348, and the third pressure switch 360 is capable of detecting the position of the third shift valve 350. The fourth pressure switch 362 is able to detect the position of the third trim valve 318, and thus whether C3 is engaged or not. If the transmission is operating in a steady state neutral with C5 applied, and the fourth pressure switch 362 detects movement of the third trim valve 318 from its de-stroked position to its stroked position (and thus C3 will be applied), the controller can detect this movement via the fourth pressure switch 362.

In this embodiment, the fourth pressure switch 362 may change state or position as the third trim valve 318 moves to a position near its halfway point between its fully stroked and fully de-stroked positions. In this instance, the fourth pressure switch 362 may be exhausted when the third trim valve 318 is de-stroked. However, as the third trim valve 318 moves to its stroked position, control main pressure fills and pressurizes the fourth pressure switch 362 thereby sending a signal to the controller indicative of this event. As noted above, reverse is achieved when C3 and C5 are applied. Thus, in neutral with C5 applied, the controller receives the message from the fourth pressure switch 362 indicating that C3 will begin filling shortly as the third trim valve 318 moves closer to its stroked position. If the controller determines that reverse is undesirable, it can control C5 to exhaust and default to the C3 Neutral state to prevent reverse. Thus, the fourth pressure switch 362 provides a good fault detection when operating in neutral.

The controller is also able to monitor the different pressure switches to determine if a particular valve strokes. For instance, if the first shift valve 346 moves to its stroked position, the first pressure switch 356 may detect this movement and communicate the same to the controller. In this way, the controller is better able to control the control system 300 and ensure the proper range is selected based on operator input. This is particularly true with the shift-by-wire system whereby the operator may select a button to control the transmission from park to a first forward range. In this event, the controller is able to detect the shift in range by monitoring the pressure switches.

Another feature of the present disclosure is the use of the pressure switches with the multiplexing function of the second shift valve 348. As previously described, the second shift valve 348 is able to control whether C2 or C5 is engaged. If the second shift valve is de-stroked, then C5 is engaged and C2 is exhausted. If the second shift valve 348 is stroked, then C2 is engaged and C5 is exhausted. Depending on the position of the second shift valve 348, the second pressure switch 358 is either pressurized or exhausted. In one embodiment, the second pressure switch 358 is exhausted when the second shift valve 348 is de-stroked, and the second pressure switch 358 is pressurized when the second shift valve 348 is stroked. In an alternative embodiment, the second pressure switch 358 is pressurized when the second shift valve 348 is de-stroked, and the second pressure switch 358 is exhausted when the second shift valve 348 is stroked. In any event, the second pressure switch 358 may change state between exhausted and pressurized when the second shift valve 348 reaches approximately halfway between the stroked and de-stroked positions. Moreover, the controller is able to detect the position of the second shift valve 348 and whether either C2 or C5 is capable of being filled and applied based whether the second pressure switch 358 is exhausted or pressurized.

Figure 5:
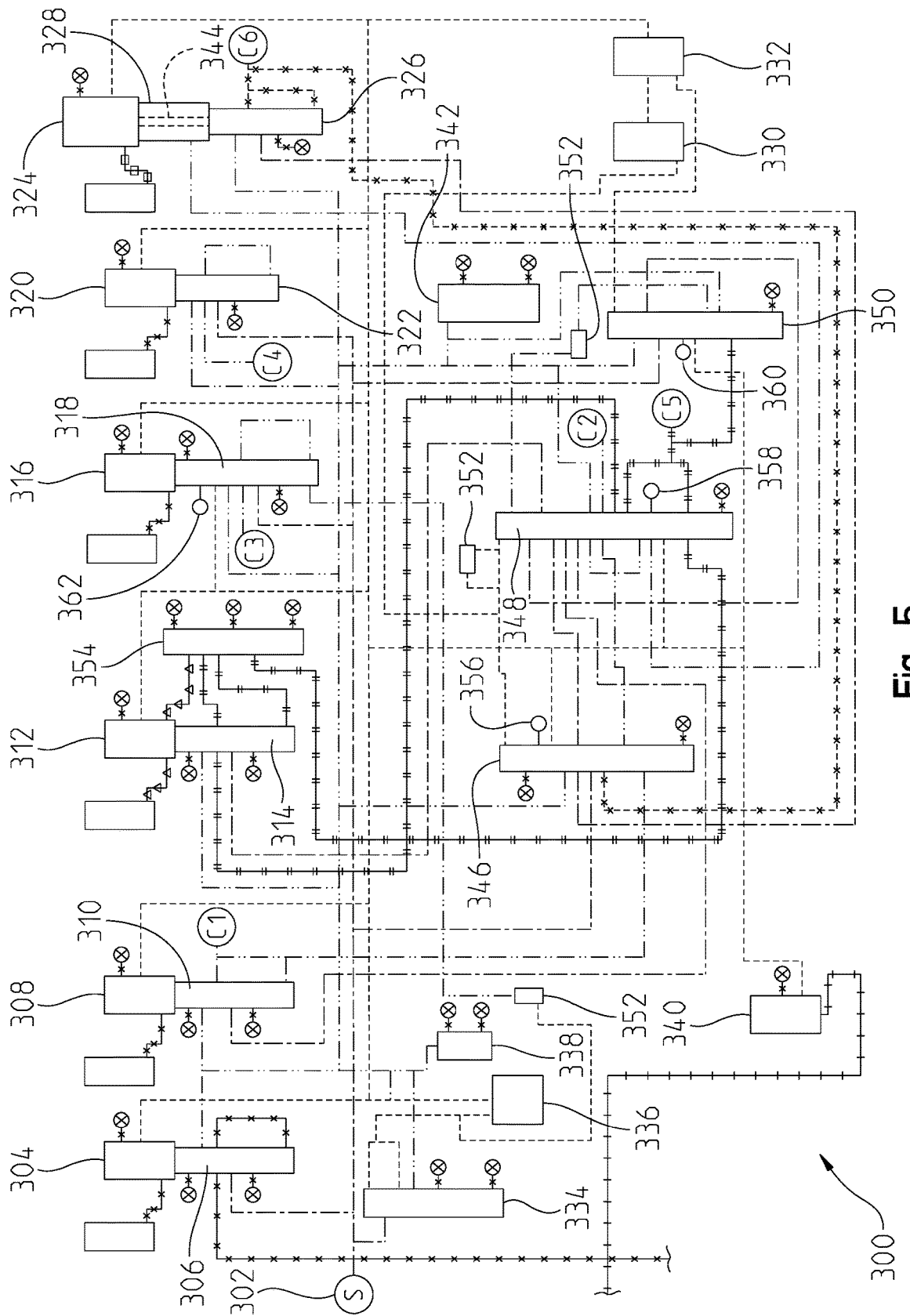
FIG. 5 is one embodiment of a hydraulic control schematic of the system of FIG. 2 in a first range.

Turning to FIG. 5, one embodiment of the control system 300 controlling the transmission in a first forward range is shown. In this embodiment, main pressure is supplied by the pressure source 302 to the system 300. The controller may send current to the first shift solenoid 330 and the second shift solenoid 332 in order to stroke the first shift valve 346 and the third shift valve 350. Control main pressure is fed from the two shift solenoids to all three shift valves, but only the first shift valve 346 and the third shift valve 350 move to their stroked positions. While control main pressure is fed to the second shift valve 348, the second shift valve 348 does not move from its de-stroked position. As described above, C5 is applied in neutral, and in the process hydraulic fluid flows from the second trim valve 314 through one end of the second shift valve 348 to fill and apply C5. As the fluid flows through the second shift valve 348, it is able to hydraulically hold or maintain the valve in this position. In other words, one of the aforementioned interlocks 1918 holds the valve in position even though control main pressure from the first shift solenoid 330 tries to move the second shift valve 348. Thus, in this first forward range (or simply first range), C5 remains applied from neutral.

Main pressure flows to the third trim valve 318 and the fourth trim valve 322 according to its normal flow path. Here, the controller does not energize the third pressure control solenoid 316 or the fourth pressure control solenoid 320, and thus the respective trim valves block main pressure from feeding either C3 or C4. In the same way, main pressure is fed through the shift valves to the first trim valve 310, but the controller also does not energize the first pressure switch 308 and C1 therefore is unable to apply due to the first trim valve 310 blocking main pressure. Lastly, with hydraulic fluid applying C5 and maintaining the second shift valve 348 in its de-stroked position, the second shift valve 348 prevents fluid from filling and applying C2. Thus, C1-C4 are not applied in first range.

In the illustrated embodiment of FIG. 5, the controller does send current to energize the fifth pressure control solenoid 324. In doing so, the fifth pressure control solenoid 324 is able to move the fifth trim valve 326 and the boost plug 328 to allow fluid to fill C6. Hydraulic fluid supplied by the pressure source 302 flows to the first shift valve 346, and with the first shift valve 346 moved to its stroked position, fluid is able to flow to the fifth trim valve 326 and fill C6. C6 is thus applied in first range.

As described above, the second pressure switch 358 is able to communicate with the controller the position of the second shift valve 348. Thus, the controller may send current to the first and second shift solenoids, and based on feedback from the first pressure switch 356 the controller is able to detect movement of the first shift valve 346 to its stroked position. When shifting from neutral to first range, however, C5 remains applied and the second shift valve 348 does not move. The controller is able to detect that the interlock acting on the second shift valve 348 is working properly so long as the second pressure switch 358 remains exhausted, for example (assuming it is exhausted in neutral). In this manner, the pressure switch is able to communicate when an interlock is active.

Similarly, an interlock may exist on the other end of the second shift valve 348. Here, this interlock is not active in first range, but it is in seventh range, eighth range and ninth range. Control main pressure fed from the third shift valve 350 acts on a top end of the second shift valve 348 to hydraulically hold the second shift valve 348 in its stroked position. As such, the second pressure switch 358 may be pressurized with the valve in this position, and the controller is able to detect the interlock being active based on the valve position.

In FIG. 6, the control system 300 is shown hydraulically operating the transmission in another embodiment of first range. In FIG. 5, the TCC solenoid 304 is de-energized such that main pressure is blocked by the TCC trim valve 306. In this embodiment, there is no lockup pressure supplied to the torque converter 202 of the transmission system 200. In FIG. 6, however, the controller may send current according to any known means for energizing the TCC solenoid 304 and moving the TCC trim valve 306 to its stroked position. As shown in FIG. 6, lockup clutch pressure may be fed from the TCC trim valve 306 to the converter flow 214. Fluid may flow from the converter flow 214 via the converter in path 222 to hydraulically apply a lockup clutch of the torque converter 202. The manner and operation of the lockup clutch may be according to any known means. Moreover, when the controller energizes or de-energizes the TCC solenoid 304 may be according to any known algorithm or process based on speed, torque, range, etc. It is noted that in the embodiment of FIG. 6, the manner in which C5 and C6 are applied is substantially the same.

Figure 16:
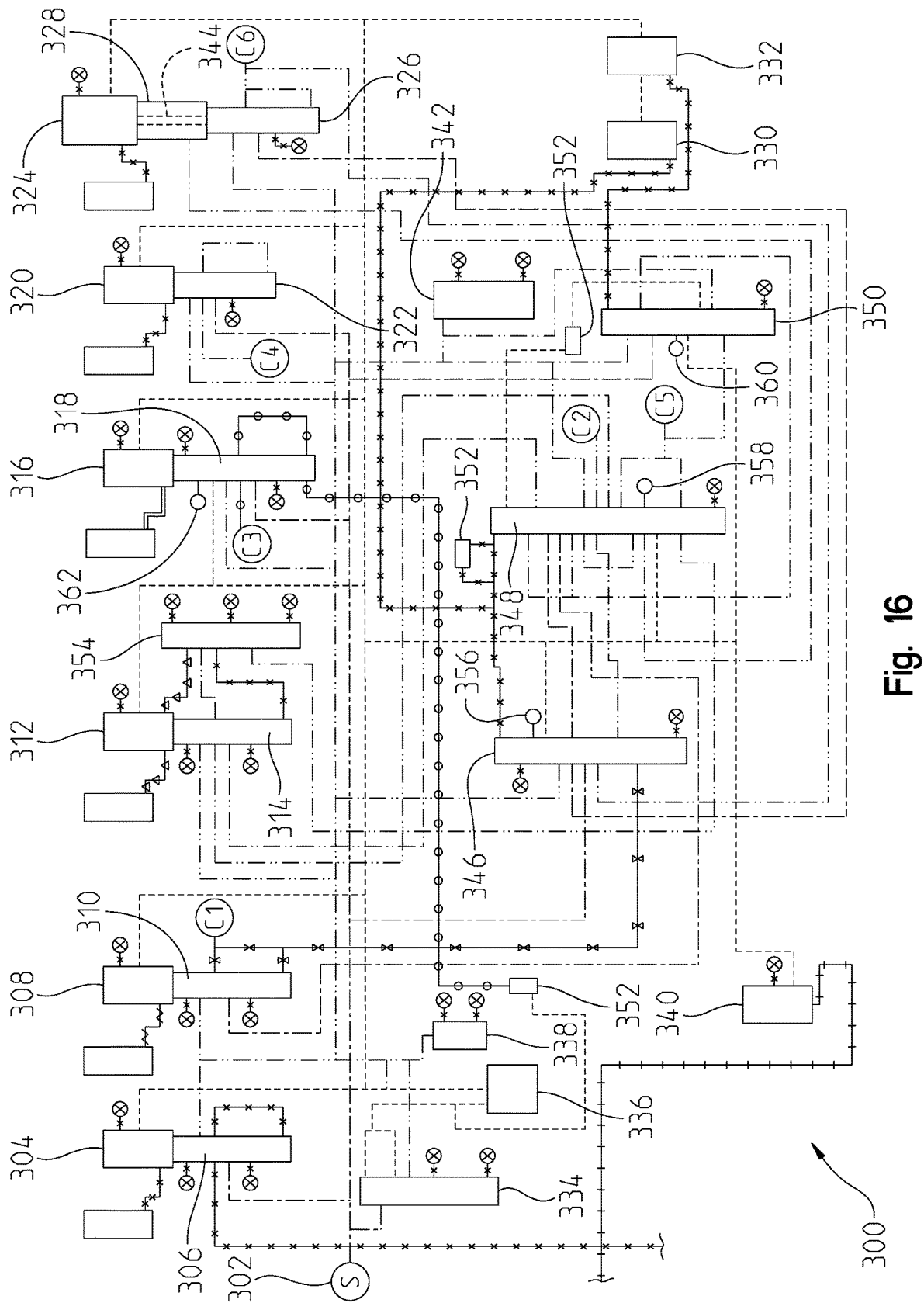
FIG. 16 is a hydraulic control schematic of the system of FIG. 2 in a second power-off range.

In the event of a power loss in first range, current is no longer sent to energize the fifth pressure control solenoid 324, the first shift solenoid 330 or the second shift solenoid 332. As a result, the fifth trim valve 326 de-strokes and blocks the fluid path to C6. C6 therefore exhausts. This is shown in FIG. 16 as well. With the second shift solenoid 332 being de-energized, the third shift valve 350 de-strokes and blocks main pressure from feeding the second trim valve 314. As a result, hydraulic fluid is no longer supplied to C5 and C5 exhausts. Thus, no fluid is supplied to either C5 or C6, which previously were both applied in first range.

As previously described, however, the first and third pressure control solenoids are normally-high solenoids which output full pressure in a power-off event. With main pressure feeding the third trim valve 318, C3 is filled and applied when there is a loss of power. Also, with the first pressure control solenoid 304 outputting pressure to the first trim valve 306, main pressure via the first shift valve 346 is able to fill and apply C1. Thus, when the control system 300 is operating in first range and there is a loss of electrical power, the control system 300 defaults to fifth range by exhausting C5 and C6 and applying C1 and C3.

In another aspect of the present disclosure, the control system 300 is able to control gain actuation via the boost plug 328. In this aspect, the control system 300 is able to provide a low clutch control gain in ninth range and a high clutch control gain in third range. To do so, the boost plug 328 may be operably controlled to adjust gain.

Before addressing C6, gain control may be relevant when a torque-transmitting mechanism may need different pressure for different ranges. For example, in one high range, the mechanism may only need 80 psi, but the same mechanism may need 230 psi in a lower range to maintain torque. To achieve these different pressures, the gain may be adjusted on the clutch trim system. In addition, a pressure switch may be used to detect high or low gain and communicate this to the controller.

C6 is applied in first, third and ninth ranges by the fifth pressure control solenoid 324 and the fifth trim valve 326. In first range, C6 may need up to 250 psi, for example, to hold torque, whereas in ninth range C6 may only need approximately 80 psi. These pressures are only provided as examples and may vary in different embodiments. Thus, these pressures are provided as non-limiting to the scope of this aspect of the present disclosure.

In first range, torque can be much greater than in ninth range. In ninth range, controllability and shift quality may be important. Thus, in first range, the gain may be set at 2.78 to achieve a higher clutch pressure, and in ninth range the gain may be set at 1.6. Again, these gain values are non-limiting and are only provided as an example of low and high gain values. Gain adjustment is available on a trim valve due to a differential area on one or more portions of the valve. This is partly described above with respect to the shift valves and the interlocks.

To take this example further, suppose a pressure control solenoid is able to output 1000 kPa. At a low range, the 2.78 gain allows the trim system to output up to 2780 kPa. Similarly, at a higher range, the 1.6 gain allows the trim system to output up to 1600 kPa. Thus, there is a relationship between the output pressure of the solenoid (usually dictated by control pressure or control main pressure) and the actual clutch pressure. Shift quality is better achieved at a lower clutch pressure, but torque requirements at the lower ranges may require greater clutch pressure to reduce or prevent clutch slippage.

Figure 8:
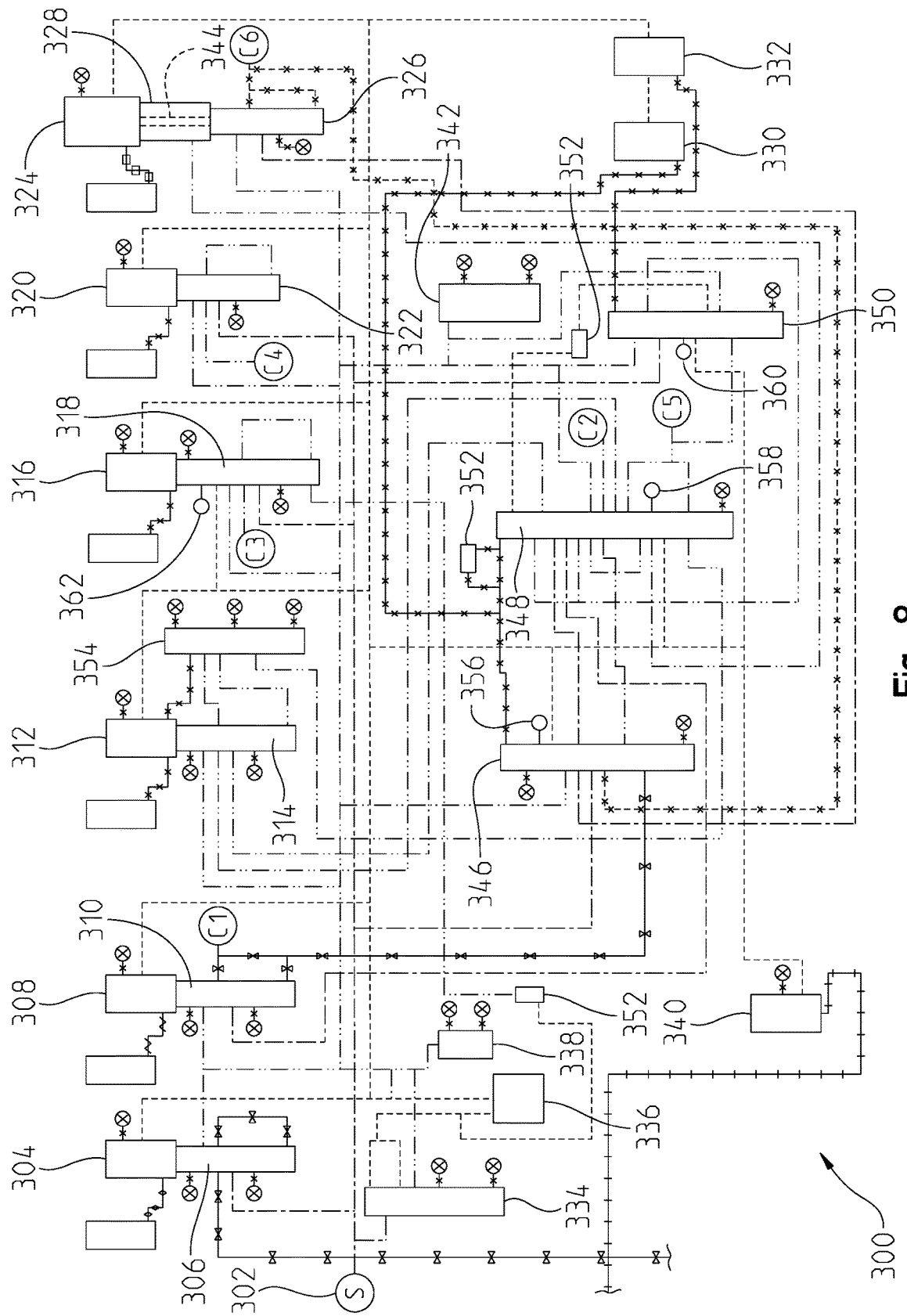
FIG. 8 is a hydraulic control schematic of the system of FIG. 2 in third range.

In addition to the above, the pressure switches can also communicate to the gain level to the controller. With regards to the fifth trim valve 326, the second pressure switch 358 is able to detect its position. In first range (FIGS. 5 and 6) and third range (FIG. 8), output pressure from the fifth pressure control solenoid 324 forces the fifth trim valve 326 and boost plug 328 in a downward or stroked position, where "downward" is only relative to how the valve and plug are shown in the drawings. In FIG. 8, for example, there is no control main pressurizing the second pressure switch 358. Based on this, the controller is able to detect that the fifth trim system is set at its high gain level.

In ninth range (FIG. 14), however, control main pressure is fed to pressurize the second pressure switch 358. The same control main pressure is fed to the boost plug 328, where the hydraulic fluid is able to flow through the channel 344 defined in the boost plug 328. As a result, hydraulic fluid separates the boost plug 328 from the fifth trim valve 326 and moves the plug 328 toward the fifth pressure control solenoid 324. In this condition or state, the trim system is at a lower gain value and the second pressure switch 358 detects and communicates this to the controller.

The high/low gain actuation of the fifth trim system allows for lower clutch pressure control in ninth range to improve shift quality and controllability, and higher clutch pressure control in first and third ranges to reduce or prevent clutch slippage. This further allows for full engine torque clutch control during a neutral to first range shift due to the higher gain, and there is no need for any additional hardware or actuators to detect the gain setting. The second pressure switch 358 is therefore capable of detecting the position of the second shift valve 348 and the gain setting of the fifth trim valve 326.

Figure 7:
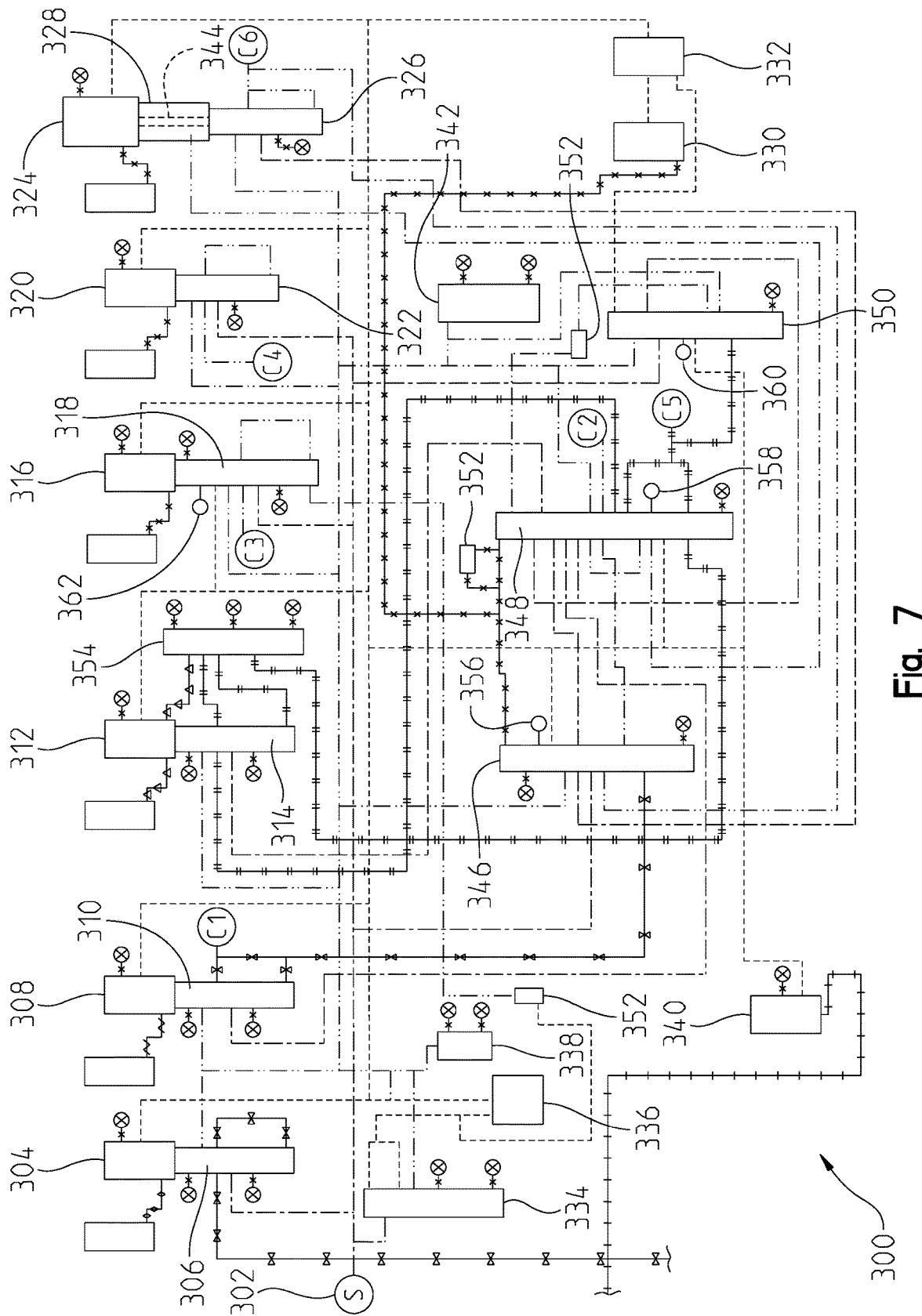
FIG. 7 is a hydraulic control schematic of the system of FIG. 2 in second range.

Referring to FIG. 7, a second forward range, or simply second range, is illustrated. Here, the control system 300 is able to selectively control hydraulic fluid to fill and apply C1 and C5. In first range, C5 and C6 are applied, and so to transition or shift to second range, C6 is exhausted and C1 is applied.

To shift to second range, the controller may energize the second shift solenoid 332 which pressurizes and strokes the third shift valve 350. The first shift solenoid 330 may not receive current in second range, and thus control main pressure is not fed to the head of either the first or second shift valves. However, the timing of this may depend upon the embodiment. For example, the controller may delay de-energizing the first shift solenoid 330 until the upshift from first range to second range is complete. Once the shift is complete, the controller may then de-energize the first shift solenoid 300. Thus, while the illustrated embodiment of FIGS. 3-17 may show one of the two shift solenoids being energized or de-energized, the controller may control the timing of when the respective solenoid is energized and de-energized to allow for various shifts of the transmission to be completed. Software, control algorithms, calibration methods, instructions, tables, graphs, and the like may be stored in a memory unit 144 of the controller 142 and executed according to any known means to control the timing of sending current to any of the solenoids in the control system 300.

In any event, in second range, the controller energizes the first pressure control solenoid 308 and the second pressure control solenoid 312 in order to move the first trim valve 310 and the second trim valve 314 to their respective stroked positions. The third pressure control solenoid 316, the fourth pressure control solenoid 320, and the fifth pressure control solenoid 324 are de-energized, and their respective trim valve is in its de-stroked position to block hydraulic fluid from filling and applying C3, C4, and C6 respectively.

As for the flow of hydraulic fluid through the control system 300, main pressure is again fed by the pressure source 302 to the first shift valve 346 and third shift valve 350 as shown in FIG. 7. Hydraulic fluid flows through the third shift valve 350 in the same manner as in first range. As it does, it may flow through the second shift valve 348 (e.g., between the first valve portion 1904 and second valve portion 1906) to the second trim valve 314. With the second trim valve 314 in its stroked position, the hydraulic fluid may be trimmed to a desired clutch pressure and redirected back to the second shift valve 348. As the fluid flows back to the second shift valve 348, it may flow between the fourth valve portion 1910 and the fifth valve portion 1912 as it fills and applies C5. As the hydraulic fluid fills and applies C5, it flows back through the second shift valve 348, and in particular on an underside of the sixth valve portion 1918, to keep the second shift valve de-stroked before it flows to an underside of the boost valve 354 to keep the boost valve 354 de-stroked. The operation of the boost valve 354 is described further below. The hydraulic fluid acting on the underside of the sixth valve portion 1918 of the second shift valve 348 may function as an interlock 1918.

To fill C1, the first shift valve 346 is in its stroked position similar to that in first range. Hydraulic fluid from the source 302 is therefore able to flow into the first shift valve 346 (e.g., between the second valve portion 1806 and the third valve portion 1808) and through the second shift valve 348 (e.g., between the second valve portion 1906 and third valve portion 1908) as the fluid is fed to the first trim valve 310. With the first trim valve 310 stroked by the first pressure control solenoid 308, hydraulic fluid is able to fill and apply C1. As fluid applies C1, hydraulic fluid is fed back to the first shift valve 346. As it does, it may flow between fifth valve portion 1812 and the sixth valve portion 1814 and form an interlock 1820 to maintain the first shift valve 346 in its stroked position.

In the event of a power loss to the system, the normally low solenoids (i.e., solenoids 320 and 324) are de-energized and output zero pressure, and the normally high solenoids (i.e., solenoids 308, 312, and 316) are de-energized but still output full pressure. As a result, main pressure is still fed to the third trim valve 318, and with it being moved to its stroked position by the third pressure control solenoid 316, hydraulic fluid is able to fill and apply C3.

During a power off event, both the first and second shift solenoids 330, 332 are de-energized, and therefore the third shift valve 350 is moved to its de-stroked position. In effect, main pressure is now blocked by the third shift valve 350 as shown in FIG. 16 and fluid is unable to flow to the second shift valve 348 and second trim valve 314. As a result, C5 is exhausted through any of its aforementioned exhaust paths. C1 remains applied as hydraulic fluid flows from the source 302 through the first and second shift valves to the first trim valve 310. Thus, in the power off event, C1 and C3 are applied to achieve fifth range. C2, C4, C5, and C6 are unapplied in this event.

As described above, the third shift valve 350 functions to block hydraulic fluid from feeding the second trim valve 314, and therefore neither C2 nor C5 is able to apply. Although main pressure may be fed to the fourth and fifth trim valves, their corresponding normally low solenoids are de-energized and thus output zero pressure. As a result, the fourth trim valve 322 blocks fluid from filling C4 and the fifth trim valve 326 blocks fluid from filling C6.

Referring to FIG. 8, the control system 300 may operably control the transmission in a third forward range, or simply third range. In third range, C1 and C6 are applied. Main pressure is supplied by the pressure source 302 to the same flow paths in the system 300 as described above. The controller may energize the first pressure control solenoid 308 and the fifth pressure control solenoid 324. As such, the first pressure control solenoid 308 outputs pressure to move the first trim valve 310 to its stroked position. Likewise, the fifth pressure control solenoid 324 outputs pressure to move the fifth trim valve 326 to its stroked position. The second pressure control solenoid 312, the third pressure control solenoid 316, and the fourth pressure control solenoid 320 are de-energized, and thus their corresponding trim valves are disposed in their de-stroked positions.

Main pressure is blocked by the third trim valve 318 and the fourth trim valve 322, and pressure therefore is unable to fill and apply C3 and C4, respectively. The first and second shift solenoids 330, 332 are also de-energized in third range, and thus the third shift valve 350 is de-stroked. With the third shift valve 350 being de-stroked, main pressure is unable to flow to the second trim system and C2 and C5 are therefore disengaged.

Main pressure does flow into the first shift valve 346 and the second shift valve 348. As a result, with the first trim valve stroked, hydraulic fluid is able to flow through the first and second trim valves and feed C1. If the transmission is upshifting from second range to third range, C1 is already filled and applied. Hydraulic fluid from C1 backfills to the first shift valve 346 and acts against a differential area on the first shift valve 346 to form an interlock and keep the valve stroked.

Hydraulic fluid may also be fed from the first shift valve 346 to the fifth trim valve 326. With the fifth trim valve 326 moved to its stroked position, fluid is able to fill and apply C6. Thus, C1 and C6 are applied in third range.

In the event of a power loss to the controller, the control system 300 is configured to control the transmission to fifth range with C1 and C3 applied. In doing so, electrical current is no longer sent by the controller to any of the solenoids. Therefore, the normally low pressure control solenoids and the first and second shift valves are de-energized and output zero pressure. C6 is therefore exhausted when the fifth trim valve 326 is de-stroked. C4 likewise remains unfilled with the fourth trim valve 322 blocking main pressure. Since the second shift solenoid 332 is de-energized, the third shift valve 350 is disposed in its de-stroked position thereby blocking hydraulic fluid from flowing to the second trim valve 314. Even though the second pressure control solenoid 312 outputs full pressure in the power off event, hydraulic fluid is blocked by the third shift valve 350 and neither C2 nor C5 can be applied.

In third range, C1 is applied and hydraulic fluid feeding C1 further feeds back to the first shift valve 346 and holds it in the stroked position based on the interlock formed there. The first trim valve 310 remains stroked since the first pressure control solenoid 308 outputs full pressure, and C1 therefore remains applied. In addition, the third pressure control solenoid 316 outputs full pressure in the power off state thereby moving the third trim valve 318 to its stroked position. Since main pressure is fed directly to the third trim system, hydraulic fluid is able to fill and apply C3. As a result, C1 and C3 are applied in the power off state and the control system 300 defaults to fifth range.

Figure 9:
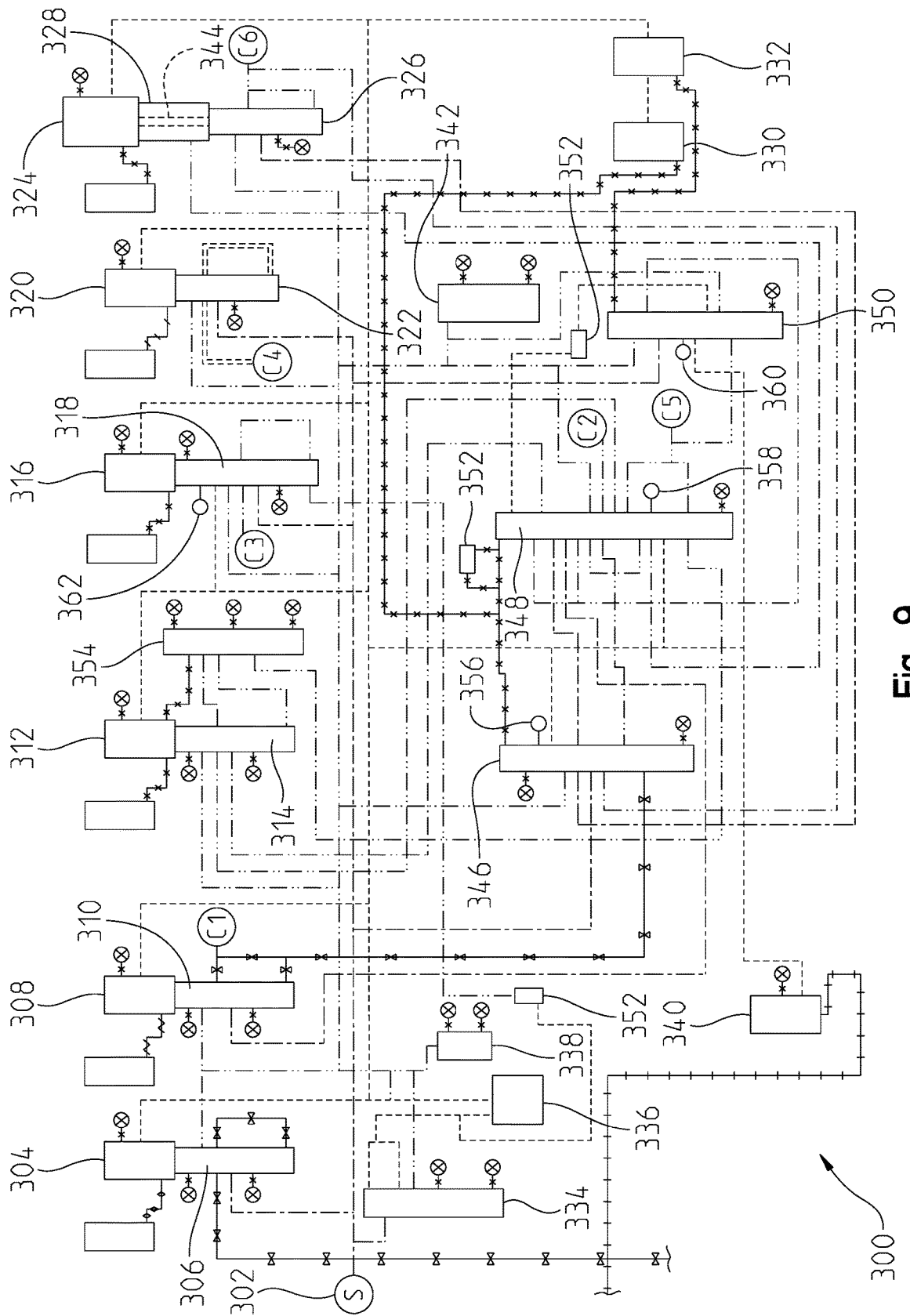
FIG. 9 is a hydraulic control schematic of the system of FIG. 2 in fourth range.

Referring to FIG. 9, the control system 300 is shown in an embodiment of controlling the transmission in a fourth forward range or fourth range. In fourth range, C1 and C4 are applied. To do so, the controller may energize the first pressure control solenoid 308 and the fourth pressure control solenoid 320. The first pressure control solenoid 308 outputs pressure to move the first trim valve 310 to its stroked position, and the fourth pressure control solenoid 320 outputs pressure to move the fourth trim valve 322 to its stroked position. The other pressure control solenoids and the two shift solenoids are de-energized. Thus, C3 and C6 are unapplied since the third trim valve 318 and the fifth trim valve 326 are de-stroked and block fluid from filling either clutch. Moreover, with the second shift solenoid 332 de-energized, the third shift valve 350 is de-stroked which blocks main pressure from feeding the second trim system. As a result, neither C2 nor C5 is able to be applied in fourth range.

Main pressure is provided by the pressure source 302 and directly feeds the fourth trim system, as shown in FIG. 9. With the fourth trim valve 322 in its stroked position, hydraulic fluid is able to fill and apply C4. Moreover, although the first shift solenoid 330 is de-energized, C1 is applied via hydraulic fluid flowing through the first shift valve and second shift valve to the first trim system. With C1 filled, hydraulic fluid flows back to the first shift valve 346 and the clutch pressure acting against a differential area (e.g., between valve portions 1812 and 1814) on the first shift valve 346 to form the interlock 1820 and maintain the shift valve in its stroked position. Thus, C1 and C4 are applied in fourth range.

In the event of a power loss to the controller, C4 is exhausted when the controller is unable to send current to energize the fourth pressure control solenoid 320. Since the fourth pressure control solenoid 320 may be a normally low solenoid, when it is de-energized it outputs zero pressure to the trim valve. Thus, the fourth trim valve 322 de-strokes and blocks hydraulic fluid from filling C4. Similarly, C6 remains unapplied due to the fifth trim valve 326 being de-stroked and blocking fluid.

Similar to the aforementioned first, second, and third ranges, the first and second shift solenoids are de-energized causing the third shift valve 350 to be in its de-stroked position. As a result, hydraulic fluid is blocked by the third shift valve 350 and is unable to feed the second trim system. C2 and C5 are therefore unapplied in the power off state.

Further, the third pressure control solenoid 316 is energized and outputs full pressure in the power off state. This moves the third trim valve 318 to its stroked position, and since main pressure is fed directly to the third trim system, fluid is able to fill and apply C3.

C1 is continuously fed with hydraulic fluid to remain applied during the power off state. Even though the first shift valve 346 is not receiving control main pressure from the first shift valve 330, pressure that fills and applies C1 flows back and acts against the differential area of the first shift valve 346 to form the interlock 1820 and keep the first shift valve 346 in its stroked position. As a result, when the control system 300 is operating in fourth range and electrical power is lost, the control system 300 defaults to fifth range with C1 and C3 applied (see FIG. 16).

Figure 10:
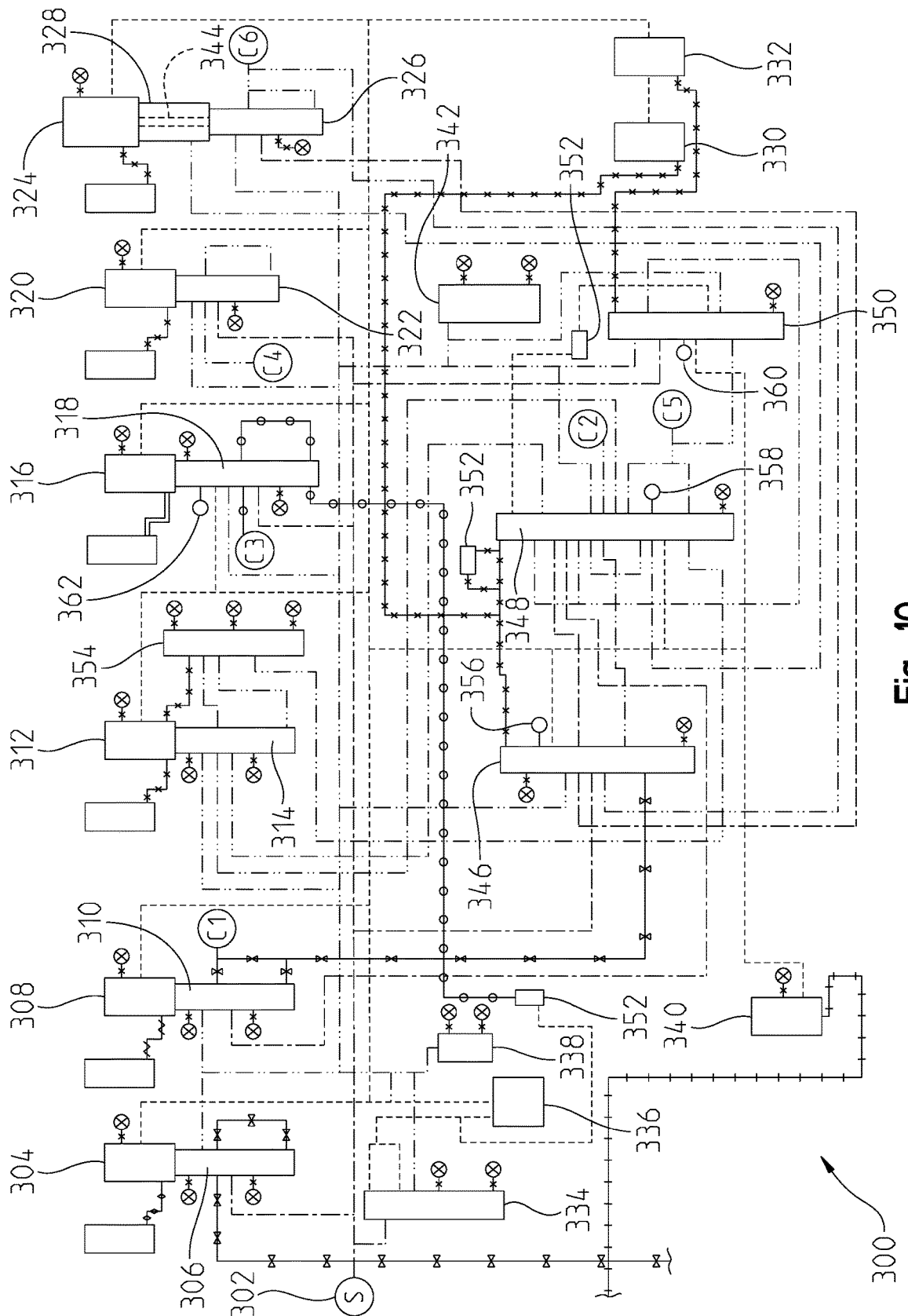
FIG. 10 is a hydraulic control schematic of the system of FIG. 2 in fifth range.

In FIG. 10, the control system 300 is shown in another embodiment in which it is operably controlling the transmission in a fifth forward range, or fifth range. As described previously in several of the embodiments above, fifth range may be obtained by applying C1 and C3. Fifth range also happens to be the default range during a power loss event when the control system 300 is operably controlling the transmission in first range, second range, third range, and fourth range. Thus, fifth range may also be referred to as a low range default for purposes of this disclosure. The control system 300 may operate differently when the transmission is in either reverse or neutral when there is a power loss, and this was described above in which the control system 300 defaults to the C3 Neutral state. Here, in the lower forward ranges (i.e., first range through fifth range), the control system 300 defaults to fifth range in the event of an electrical power loss. It should be noted that other default ranges may be possible, and fifth range is only illustrated and described herein as one such embodiment.

To operably control the transmission in fifth range, the controller may energize the first pressure control solenoid 308 and the third pressure control solenoid 316. In doing so, each solenoid actuates and moves the first trim valve 310 and third trim valve 318 to their respective stroked positions. Main pressure is supplied by the pressure source 302 directly to the third and fourth trim systems, as shown in FIG. 10. With the third trim valve 318 in its stroked position, hydraulic fluid is able to fill and apply C3. On the other hand, the fourth trim valve 322 is in its de-stroked position thereby blocking fluid from filling C4. Similarly, the fifth trim valve is de-stroked thereby blocking fluid from filling and applying C6.

With the first and second shift solenoids de-energized in fifth range, there is no control main pressure being supplied to the head end of any of the three shift valves. As such, the third shift valve 350 is de-stroked and blocks hydraulic fluid from being supplied to the second trim system. C2 and C5 are therefore unapplied since no hydraulic fluid is able to flow through the third shift valve 350.

C1 is applied in fifth range and it is done so by hydraulic fluid flowing through the first and second shift valves before feeding the first trim system. With the first trim valve 310 being in the stroked position, hydraulic fluid is able to fill and apply C1. C1 pressure, as shown in FIG. 10, may flow back to the first shift valve 346 as it does in second range, third range and fourth range. Here, the C5 pressure acts against a differential area on the first shift valve 346 (e.g., the sixth valve portion 1814) to form an interlock 1820, which hydraulically holds or maintains the first shift valve 346 in its stroked position.

Unlike the previously described forward ranges, when electrical power is lost and the controller is unable to send current to any of the solenoids in the control system 300, the same two torque-transmitting mechanism (i.e., C1 and C3) remain applied when the transmission is operating in fifth range. In other words, when the transmission is operating in fifth range and there is a loss of electrical power, the default is fifth range and so there is no shift to another range. In the power loss state, C4 and C6 remain unapplied since the normally low fourth pressure control solenoid 320 and the normally low fifth pressure control solenoid 324 output zero pressure and the corresponding trim valves remain de-stroked to block hydraulic fluid from filling C4 and C6. Moreover, the second shift solenoid 332 is de-energized thereby resulting in the third shift valve 350 being de-stroked. When the third shift valve 350 is de-stroked, hydraulic fluid is unable to flow to the second trim system and fill either C2 or C5. Thus, C2 and C5 are unapplied in the power loss state.

The normally high pressure control solenoids may output full pressure in the power loss state. In view of this, the first pressure control solenoid 308 and third pressure control solenoid 316 output full pressure causing the first trim valve 310 and the third trim valve 318 to be disposed in their stroked positions. This allows hydraulic fluid to fill and apply C1 and C3 in the same manner as in the steady state fifth range described above.

In this disclosure, there may be three default ranges that the control system 300 defaults to when electrical power is lost. The first default range is C3 Neutral, and as described above, this is selected when the transmission is operating in either reverse or neutral before the power is lost. The second default range is fifth range with C1 and C3 applied, and this occurs when the transmission is operating in first range, second range, third range, fourth range, and fifth range. The third default range is seventh range, and this occurs during a power loss event when the transmission is operating in sixth range, seventh range, eighth range or ninth range.

These latter forward ranges and the third default range will be described below. However, it is to be understood that these default ranges are applicable to the illustrated embodiments provided herein. Other embodiments of the control system may default to other ranges. For example, there can be fewer than three default ranges, or in some instances, there may be more than four default ranges. Thus, this principles and teachings of this disclosure is not intended to be limited to any particular default range or number of default ranges.

Figure 11:
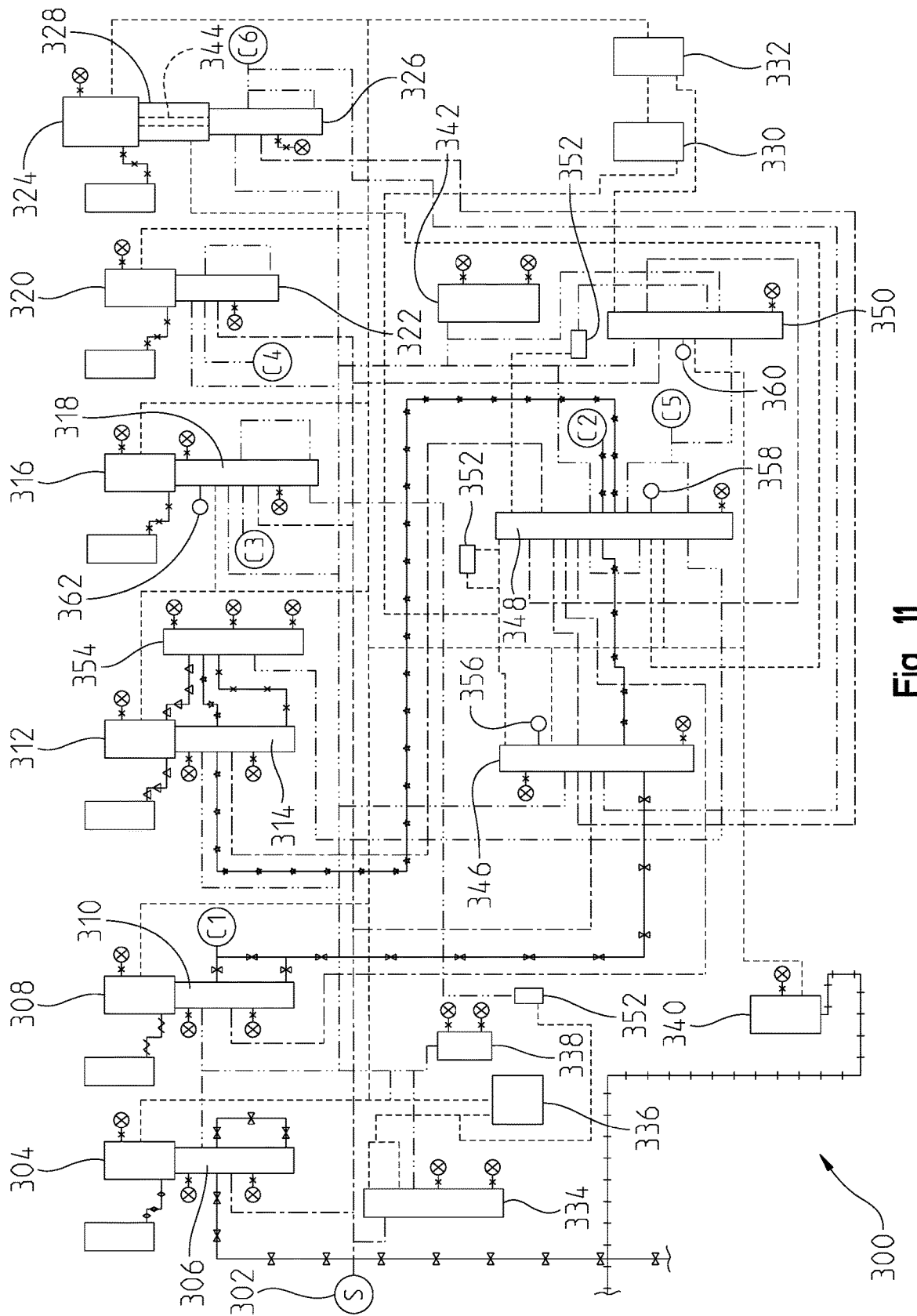
FIG. 11 is a hydraulic control schematic of the system of FIG. 2 in sixth range.

Turning to FIG. 11, the control system 300 is able to operably control the transmission in a sixth forward range or sixth range. Here, the second shift valve 348 is actuated to its stroked position to allow C2 to fill and apply. In addition, C1 is applied in sixth range. For C1, the controller may energize the first pressure control solenoid 308 which moves the first trim valve 310 to its stroked position. In addition, the second pressure control solenoid 312 may be energized thereby moving the second trim valve 314 to its stroked position. At the same time, the third pressure control solenoid 316, the fourth pressure control solenoid 320, and the fifth pressure control solenoid 324 are de-energized. Thus, hydraulic fluid is blocked by the third trim valve 318, the fourth trim valve 322, and the fifth trim valve 326, which effectively prevents C3, C4, and C6 from filling and being applied.

In this embodiment, the first and second shift solenoids are energized. As shown, control main pressure is fed from the control main filter 336 to the first shift solenoid 330 and the second shift solenoid 332. In turn, control main pressure is fed to the head end of the first shift valve 346, the second shift valve 348, and the third shift valve 350. All three shift valves are thereby moved to their stroked positions. With the third shift valve 350 in its stroked position, main pressure is fed through the shift valve as shown in FIG. 17 and to the second shift valve 348. The hydraulic fluid is able to flow through the second shift valve 348 to the first trim system, and with the first trim valve 310 in its stroked position, the fluid is able to fill and apply C1.

In the same manner, hydraulic fluid from the pressure source 302 is able to flow directly to the first shift valve 346. With the first shift valve 346 stroked, fluid is able to flow to the second shift valve 348 where it flows to the second trim system. With the second trim valve 314 in its stroked position, hydraulic fluid is able to flow through the second trim valve 314 and back to the second shift valve 348 where it fills and applies C2. C2 pressure further flows to the first shift valve 346 and acts against another differential area on the first shift valve 346 (e.g., between the fourth valve portion 1810 and the fifth valve portion 1812) to form another interlock 1818 on the first shift valve 346. Thus, in sixth range, C1 and C2 are applied.

When hydraulic fluid flows to the second trim system and the second trim valve 314 is in its stroked position, the hydraulic fluid is able to flow to the boost valve 354. The boost valve 354 may be used to "boost" or increase clutch pressure to allow a torque-transmitting mechanism to handle high torque operating modes. In the illustrated embodiment of FIG. 11, C2 is applied to cover the highest torque operating modes, whereas C5 may be designed such that it is unable to handle such torque modes. C5 may be damaged due to compressive failure to elevated pressures, and therefore the control system 300 may be designed to prevent the boost valve 354 from being actuated when C5 is engaged. In effect, the use or not of the boost valve 354 is a form of gain control of the second trim system that is different from the aforementioned gain control of the fifth trim system.

In at least one example, it is desirable to limit C5 pressure to below main pressure, whereas it is desirable for C2 pressure to be approximately equivalent to main pressure in at least one forward range. In another example, C2 and C5 pressures may be less than main pressure, but when the boost valve is actuated, C2 pressure is capable of being greater than C5 pressure. In a further example, the boost valve is actuated (or stroked) when C2 is applied and deactuated (or de-stroked) when C5 is applied.

With a lower C5 pressure, the control system 300 is better able to provide improved shift quality and controllability. Further, the second pressure control solenoid 312 and second trim valve 314 may be able to further trim C5 pressure if necessary. Thus, C5 pressure is more controllable with the boost valve 354 de-stroked. As shown in FIG. 7, however, there is no solenoid for independently controlling movement of the boost valve 354. Thus, in the illustrated embodiment, C5 pressure may be used as a blocking feature or mechanism to prevent the boost valve 354 from moving to its stroked position when C5 is applied. In second range, for example, main pressure is fed to the second trim system via the second and third shift valves. Hydraulic fluid flows through the second trim valve 314 and back to the second shift valve 348 where it fills and applies C5. Once C5 is filled, fluid is able to flow back to the second trim system and it flows to a bottom side of the boost valve 354. C5 pressure therefore urges or forces the boost valve 354 to remain in its de-stroked position, thereby limiting C5 pressure. The blocking feature or mechanism of the C5 pressure acting against the boost valve 354 is similar to an interlock, except that here it hydraulically holds or maintains the boost valve 354 from moving to its stroked position. By contrast, an interlock as described herein is hydraulic pressure that hydraulically holds or maintains a valve in its stroked position and prevents it from moving to its de-stroked position.

With the boost valve 354 hydraulically held from moving to its stroked position, C5 pressure may be reduced and maintained below main pressure. In one embodiment, the second pressure control solenoid 312 may be limited from outputting any pressure above control main pressure. The second trim valve 314 may have a gain associated with it so that C5 pressure can be greater than control main pressure. For example, if the gain is 1.25 and control main pressure is 1000 kPa, then C5 pressure may be 1250 kPa. The gain may be a function of the differential areas on the second trim valve 314.

In FIG. 11, the boost valve 354 may be active and C2 pressure may be approximately main pressure. Here, as main pressure is fed to the second trim system and fluid flows through the second trim valve 314, it also flows to the boost valve 354. This flow to the boost valve 354 causes the boost valve 354 to move to its stroked position. Moreover, with C5 unapplied, there is no hydraulic fluid supplied to the bottom side of the boost valve 354. The boost valve 354 is therefore able to move to its stroked position and allow for increased C2 pressure. The same gain is available with the second trim valve 314, but with the boost valve 354 now stroked, the second trim valve 314 can move even further to a fully stroked position, for example, so that main pressure is fed to C2. In effect, the second trim valve 314 is able to be stroked further with the boost valve 354 active so that main pressure is fed to C2. By contrast, with C5 applied, the second trim valve 314 is stroked but to a much lesser degree because the boost valve 354 is inactive.

Tolerances in the second trim system may be provided via a limit on the second pressure control solenoid 312 or other tolerances within the main and control main circuits.

Before returning to sixth range, it is further shown here that the second shift valve 348 may be provided to limit or prevent C2 and C5 from both being applied at the same time. In effect, this provides failure mode protection by allowing only one of these two torque-transmitting mechanisms from being applied at a time.

In sixth range, the control system 300 operably controls the transmission with C1 and C2 applied. In the event of a power loss, the controller may be unable to send current to any of the solenoids. As shown in FIG. 17, another default range may be provided in the event of a power loss while operating in sixth range. In this case, the first shift solenoid 330 and the second shift solenoid 332 are both de-energized. Thus, the third shift valve 350 moves to its de-stroked position and blocks hydraulic fluid from flowing to C1. In effect, the third shift valve 350 blocks fluid from reaching the first trim system, and thus C1 cannot be applied.

The normally low fourth pressure control solenoid 320 and the fifth pressure control solenoid 324 may be de-energized when electrical power is lost, and therefore both solenoids do not output any pressure. As a result, the fourth and fifth trim valves are in their de-stroked positions and block main pressure from feeding either C4 or C6. Thus, as described herein, when operating in sixth range and there is a loss of electrical power, C1, C4, C5 and C6 are unapplied. C2 and C3 are therefore applied in a high default range corresponding with seventh range.

C3 is applied in this default range due to main pressure being fed directly to the third trim system as shown in FIG. 17. Moreover, the third pressure control solenoid 316 may be a normally high solenoid and thus outputs full pressure when there is a loss of power. In doing so, the third trim valve 318 is actuated to its stroked position thereby allowing hydraulic fluid to fill and apply C3.

As described above, C2 is applied in sixth range. C2 pressure is able to form an interlock on both the first shift valve 346 and the second shift valve 348 in sixth range. Referring to FIGS. 18 and 19, for example, C2 pressure may form an interlock 1818 on the first shift valve 346 and another interlock 1916 on the second shift valve 348. Thus, even though control main pressure is cut off when the first shift solenoid 330 is de-energized, C2 pressure is able to hold the first and second shift valves in their stroked positions due to the interlocks in the high default range. Since shift valve 348 is latched in the stroked position, main feed is blocked to C5.

As also shown in FIG. 17, the boost valve 354 may be fully stroked so that C2 pressure may be approximately equal to main pressure. The second trim system may adjust C2 pressure as desired, but it is worth noting that the both the second trim valve 312 and boost valve 354 are in their stroked positions.

Referring now to FIG. 12, the control system 300 is shown operably controlling the transmission in a seventh forward range, i.e., seventh range. In seventh range, C2 and C3 are applied as described above. In normal or steady state seventh range shown in FIG. 12, the controller may energize the second pressure control solenoid 312 and the third pressure control solenoid 316. In addition, the first pressure control solenoid 308, the fourth pressure control solenoid 320 and the fifth pressure control solenoid 324 are de-energized. The controller further energizes the first shift solenoid 330 but de-energizes the second shift solenoid 332.

Hydraulic fluid may be fed to the control system 300 via the fluid pressure source 302, which as described above may be supplied by the hydraulic pump 204 of the transmission system 200. From the pressure source 302, which may further be referred to as a main pressure circuit of the control system 300, hydraulic fluid may be fed directly to the first shift valve 346, the third shift valve 350, the third trim system and the fourth trim system. With the third pressure control solenoid 316 being energized, the third trim valve 318 may be moved to its stroked or open position to allow hydraulic fluid to fill and apply C3.

With the first, fourth and fifth trim systems de-energized, the respective trim valves may block hydraulic fluid from filling C1, C4, and C6. With C1, however, hydraulic fluid may be blocked upstream via the third shift valve 350 which is in its de-stroked position since the second shift solenoid 332 is de-energized.

With the first shift solenoid 330 energized, control main pressure may be fed to the head of each of the first and second shift valves thereby moving both shift valves to their stroked positions. Main pressure may be fed to the first shift valve directly from the pressure source 302. With the first shift valve 346 stroked, hydraulic fluid may flow through the first shift valve 346 and the second shift valve 348 to the second trim system. Since the second pressure control solenoid 312 is energized, the second trim valve 314 may be in its stroked position, and therefore hydraulic fluid is able to flow through the second trim system back to the second shift valve 348 and fill and apply C2. In addition, hydraulic fluid flowing through the second trim valve further flows to the boost valve 354 and strokes the boost valve 354 to its stroked position. With C5 exhausted, there is no hydraulic pressure opposing the boost valve 354 from moving to its stroked position. As a result, C2 pressure may be increased or boosted to approximately main pressure.

As also shown in FIG. 12, C2 pressure flows through both the first shift valve 346 and the second shift valve 348 and acts on differential areas or lands of both valves. In effect, C2 pressure acting on these differential areas forms an interlock on both valves to hold them in place. Since control pressure is still fed to the head of each of the first and second shift valves, the interlocks may be unnecessary in seventh range but the C2 pressure nevertheless fills and applies hydraulic pressure to the differential areas on both valves.

In the event of an electrical power loss, the control system 300 is able to default to seventh range as well. Thus, when the transmission is in seventh range and there is an electrical power loss, the transmission does not shift and instead stays in seventh range with C2 and C3 applied. The normally high pressure control solenoids default to full output pressure and the normally low pressure control solenoids default to zero output pressure. Thus, C4 and C6 are unapplied in the event of a power loss since both the fourth and fifth trim valves block hydraulic fluid. Moreover, the first and second shift solenoids are de-energized and therefore the third shift valve 350 is in its de-stroked position. As such, the third shift valve 350 blocks hydraulic fluid from filling C1.

The second pressure control solenoid 312 and the third pressure control solenoid 316 output full pressure in the event of an electrical power loss. Since main pressure is fed directly to the third trim system, hydraulic fluid is able to fill and apply C3. Moreover, C2 pressure applies interlocks on the first shift valve 346 and the second shift valve 348 as described above. Thus, even though the first shift solenoid 330 is de-energized and no longer supplies control main to the head of either the first or second shift valves, the interlocks formed by C2 pressure maintains both shift valves in their stroked positions. Since the C2 latch maintains shift valve 348 in a stroked position, main pressure is block from feeding C5.

As also shown in FIG. 17, while the first shift solenoid 330 is de-energized in the event of an electrical power loss, control main pressure may be slow to exhaust and still apply an interlock at the head of the second shift valve 348 as it flows through a fluid path via the third shift valve 350. In effect, a high speed logic valve latch or interlock may be applied to the second shift valve 348 in this embodiment to maintain the second shift valve 348 in its stroked position. The slow exhaust of control main pressure may be partly due to the check valve 352 and a restriction in the fluid path. While operating in seventh range, hydraulic fluid at control main pressure may be fed from the control main valve 334 directly to the main modulated solenoid 340 and third shift valve 350. This same flow path will be described below with respect to the actuation of the boost plug 328.

In any event, the hydraulic fluid at control main pressure is able to flow through the third shift valve (e.g., between the third valve portion 2008 and the fourth valve portion 2010) and through a first parallel check valve 352 (located just above the third shift valve 350 in FIG. 17) to the head of each of the first and second shift valves. The first check valve 352 may include a check ball that permits flow in a direction from the third shift valve 350 to the second shift valve 348, but prevents a return flow of the hydraulic fluid from the second shift valve 348 to the third shift valve 350. As a result, when electrical power is lost in seventh range (or forward ranges of sixth, eighth and ninth) and the first and second shift solenoids are de-energized, the hydraulic pressure at control main pressure at the heads of the first shift valve 346 and the second shift valve 348 is unable to flow back through the third shift valve 350 due to the first check valve 352.

As also shown in FIG. 17, a second check valve 352 is shown located just above the second shift valve 348. This second check valve 352 also includes a check ball that allows fluid to flow from left to right in the drawing, but the ball seats in the valve to prevent flow from right to left. Although not shown as well in FIG. 17, a flow restriction exists in a parallel flow path just below the second check valve 352 such that hydraulic fluid is partially restricted from flowing from the second shift valve 348 to the first shift valve 346 (i.e., right to left in FIG. 17). This is shown in FIG. 17 where the hydraulic fluid to the left of the restriction is shown as exhaust and the hydraulic fluid to the right of the restriction is shown as control main pressure. As a result, hydraulic fluid at control main pressure at the top or head of the second shift valve 348 is slow to exhaust due to the restriction and the second check valve 352. Thus, the hydraulic pressure is high enough such that a latch or interlock is formed to maintain the second shift valve 348 in its stroked position. C2 may exhaust in this case but the first and second shift valves remain in their stroked positions. Other means may be included in other embodiments to restrict exhaust in the control system 300.

It is further noted that if C2 is allowed to exhaust, a high speed C3 neutral may be achieved without any actuation or movement of the first shift valve 346 or the second shift valve 348. Thus, while it has been described herein that the default to seventh range when operating in a higher range is available, the control system 300 is also capable of defaulting to a high speed neutral in the event of a failure or loss of electrical power. Further, the second pressure switch 358 may continue to be pressurized such that the controller is able to detect the position of the second shift valve 348 in the event of a failure or power loss.

In addition to the high speed neutral with only C3 applied, it is also possible for the control system to default to seventh range with both C2 and C3 applied. For example, suppose an operator is operably controlling the transmission in a higher forward range such as sixth, seventh, eighth or ninth ranges. If the operator shifts to neutral, but electrical power is suddenly lost, the control system may be adapted to operably control to either the aforementioned high speed C3 neutral, or alternatively the control system may determine that the shift to neutral was by accident and maintain C2 applied such that the transmission defaults to the high speed power-off range of seventh range. If the operator does shift to neutral, and the control system detects this to be a desired shift, then C2 may be exhausted and the transmission control system 300 may default to C3 neutral in the event of the power loss. Moreover, if power is not lost, the control system may still end up in either C3 or C5 neutral.

Figure 13:
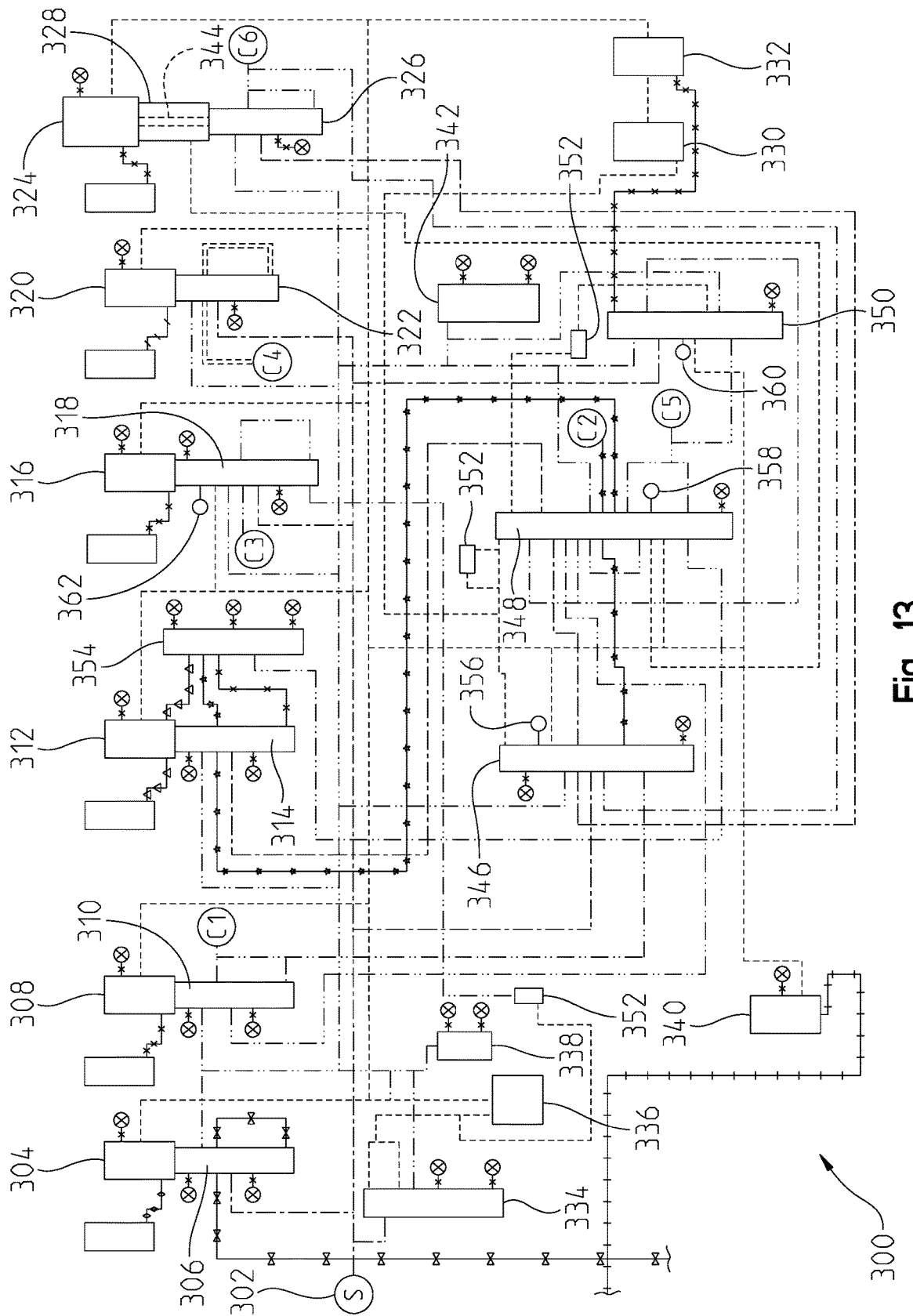
FIG. 13 is a hydraulic control schematic of the system of FIG. 2 in eighth range.

Referring to FIG. 13, the control system 300 is shown operably controlling the transmission in an eighth forward range, or eighth range. In eighth range, C2 and C4 are applied and the other torque-transmitting mechanisms are unapplied. In this range, the controller may energize the second pressure control solenoid 312 and the fourth pressure control solenoid 320. The first, third and fifth pressure control solenoids are de-energized. Further, the controller may energize the first shift solenoid 330 and de-energize the second shift solenoid 332.

With the third shift valve 350 de-stroked due to the second shift solenoid 332 being de-energized, the third shift valve 350 may block hydraulic fluid from flowing to the first trim system. Thus, C1 is blocked from receiving fluid and is thus unapplied. Further, the third pressure control solenoid 316 is de-energized and therefore the third trim valve 318 is in its de-stroked position. In this position, main pressure from the pressure source 302 is blocked by the third trim valve 318 such that fluid is unable to fill and apply C3. C3 therefore is unapplied in eighth range.

The first shift valve 346 is directly fluidly coupled to the pressure source 302, and with the first shift solenoid 330 being energized, the first shift valve 346 is in its stroked position. Hydraulic fluid is therefore able to flow through the first shift valve 346 in several flow paths. A first flow fluidly couples the first shift valve 346 to the fifth trim system. This same fluid path is used for filling and applying C6 when the fifth pressure control solenoid 324 is energized. In eighth range, however, the fifth pressure control solenoid 324 is de-energized, and the fifth trim valve 326 therefore blocks the fluid path and prevents hydraulic fluid from filling and applying C6. C6 is therefore unapplied in eighth range.

Main pressure is able to flow through a different fluid path from the first shift valve 346 to the second shift valve 348. Here, the second shift valve 348 is actuated to its stroked position with the first shift solenoid 330 being energized and thus the second shift valve 348 is fluidly coupled to the pressure source 302. Hydraulic fluid may flow through the first and second shift valves to the second trim system. With the second pressure control solenoid 312 being energized, the second trim valve 314 may be stroked thereby allowing fluid to flow through the second trim valve 314. As it flows through the second trim valve 314, the fluid flows back to the second shift valve 348 and fills C2. C2 is therefore applied in eighth range.

In addition to filling and applying C2, hydraulic fluid is fed to the boost valve 354 and actuates boost pressure for C2. This may increase C2 pressure to approximately main pressure in some embodiments. The second trim system may regulate or trim C2 pressure, if necessary. Moreover, with the second shift valve 348 stroked, main pressure is blocked from feeding C5. Thus, C5 is unable to apply in eighth range based on the position of the second shift valve 348.

Main pressure from the fluid source 302 is directly fed or fluidly coupled to the fourth trim system. In eighth range, the controller energizes the fourth pressure control solenoid 320 which actuates the fourth trim valve 322 to its stroked position. In doing so, hydraulic fluid is able to fill and apply C4 in eighth range. Thus, C2 and C4 are applied in eighth range.

In the event electrical power is lost while operating in eighth range, the control system 300 may be designed to default to seventh range in a similar fashion as if operating in either sixth or seventh ranges. Here, C4 is exhausted and C3 is applied. As has been described, when electrical power is lost, the three normally high pressure control solenoids output full pressure and the two normally low pressure control solenoids output zero pressure. Moreover, the two shift solenoids are de-energized.

With the second shift solenoid 332 being de-energized, the third shift valve 350 is disposed in its de-stroked position. In its de-stroked position, the third shift valve 350 blocks hydraulic fluid from feeding C1. Further, with both normally low pressure control solenoids de-energized, the fourth trim valve 322 and the fifth trim valve 326 are de-stroked and therefore block hydraulic fluid from feeding C4 and C6. In other words, in eighth range the fourth pressure control solenoid 320 is energized by the controller so that C4 is applied, but when electrical power is lost the controller no longer sends current to the fourth pressure control solenoid 320. Once this happens, the fourth pressure control solenoid 320 outputs zero pressure to the fourth trim valve 322, thereby causing the fourth trim valve 322 to move from its stroked position to its de-stroked position. In doing so, the fourth trim valve 322 blocks hydraulic fluid from filling C4, and C4 pressure is therefore able to exhaust.

In eighth range, C3 is unapplied but when power is lost, the third pressure control solenoid 316 outputs full pressure to thereby move the third trim valve 318 to its stroked position. In doing so, main pressure is fed to the third trim system such that C3 is applied. Also, C2 is applied in eighth range and remains applied in the event of a loss of electrical power. The second pressure control solenoid is a normally high solenoid, and thus it outputs full pressure to keep the second trim valve 314 stroked. C2 pressure further acts on differential areas on the first shift valve 346 and the second shift valve 348 to hydraulically hold the shift valves in their stroked positions. In other words, interlocks are formed on both shift valves to remain stroked. Shift valve 348 therefore blocks main feed to C5. With the first and second shift valves stroked and the first shift valve 346 being directly fluidly coupled with the pressure source 302, hydraulic fluid is able to continue to flow through both shift valves and the second trim system before returning to the second shift valve 348 and feeding C2. Thus, C2 and C3 are applied in the high default range, i.e., seventh range, as shown in FIG. 17.

Figure 14:
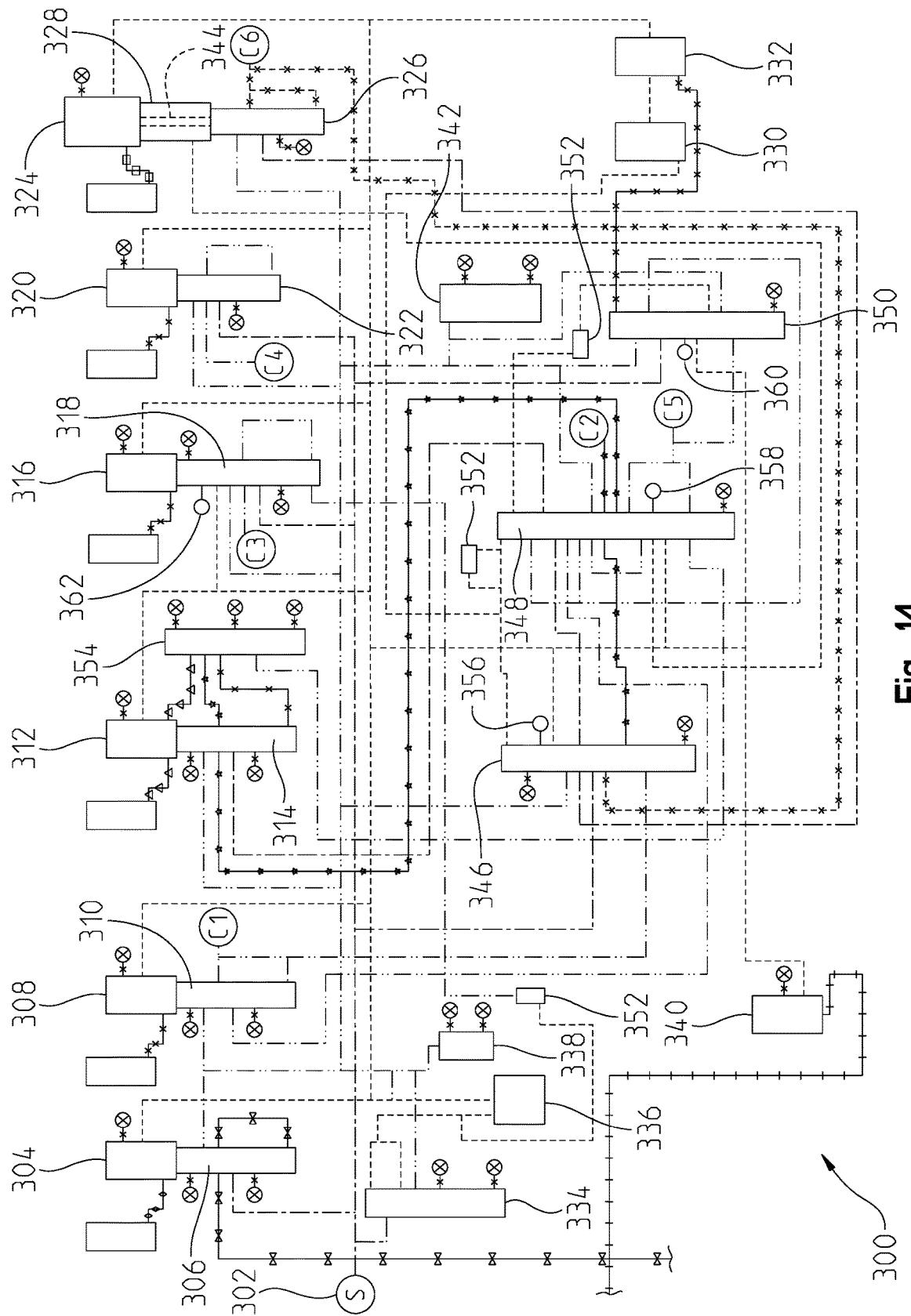
FIG. 14 is a hydraulic control schematic of the system of FIG. 2 in ninth range.

Referring to FIG. 14, the control system 300 is able to operably control the transmission in a ninth forward range, i.e., ninth range. In ninth range, C2 and C6 may be applied. To do so, the controller may energize the second pressure control solenoid 312 and the fifth pressure control solenoid 324. The first shift solenoid 330 is energized, but the second shift solenoid 332 is de-energized, as shown in FIG. 14. With the first shift solenoid 330 being energized, control main pressure is fed via the solenoid 330 to the head of both the first shift valve 346 and the second shift valve 348 causing both valves to be in their stroked positions. As will also be described below, C2 pressure may exert pressure against a differential area on both valves to form interlocks and hydraulically hold both of the first and second shift valves in their stroked positions.

With the second and fifth pressure control solenoids being energized, the second trim valve 314 and the fifth trim valve 326 are disposed in their stroked positions. On the other hand, with the first, third and fourth pressure control solenoids being de-energized, the first trim valve 310, the third trim valve 318, and the fourth trim valve 322 are disposed in their de-stroked positions. Further, with the second shift solenoid 332 being de-energized, the third shift valve 350 is in its de-stroked position in ninth range.

As previously described, the second shift solenoid 332 is de-energized in seventh and eighth ranges and, as shown in FIG. 14, it is also de-energized in ninth range. With it de-energized, the third shift valve 350 is disposed in its de-stroked position thereby blocking hydraulic fluid from being able to flow and fill C1. In effect, C1 is unable to apply when the transmission is operating in a higher range (i.e., seventh, eighth, and ninth ranges), which provides protection to the transmission from possible damage if C1 was to come on in any of these higher ranges. Thus, the third shift valve 350 provides a protective feature to the control system 300 and the transmission.

Since the third pressure control solenoid 316 and the fourth pressure control solenoid 320 are de-energized, the third trim valve 318 and fourth trim valve 322 are de-stroked and block hydraulic fluid from filling either C3 or C4. Thus, in ninth range, C3 and C4 are unapplied. While this is the case, it is also shown in FIGS. 3-17 that main pressure is fed directly from the fluid source 302 to both the third and fourth trim systems. For this reason, the mechanization chart 2100 in FIG. 21 illustrates that both C3 and C4 are capable of being applied in any range (i.e., reverse, neutral, or first through ninth ranges). If the controller simply energizes either the third or fourth pressure control solenoid, hydraulic fluid will fill and apply C3 or C4. The caveat to this is if electrical power is lost, and then the normally low fourth pressure control solenoid 320 will be de-energized and output zero pressure. As described herein, the fourth trim valve 322 will de-stroke and block the fluid from filling C4 when electrical power is lost.

In any event, the mechanization table 2100 in FIG. 21 provides a summary of which torque-transmitting mechanisms are available in each range depending upon which solenoids are energized by the controller. The table also shows the corresponding hydraulic default range for each given steady state range in the event of a power loss. Another feature of the mechanization table 2100 is the position of each shift valve. In this table, a zero (0) indicates the shift valve is de-stroked, whereas a one (1) indicates the shift valve is in its stroked position. In ninth range, for example, the first and second shift valves are shown as being stroked (1) and the third shift valve 350 is shown being de-stroked (0). This is further supported by the embodiment of FIG. 14.

Returning to FIG. 14, the first shift valve 346 is in its stroked position. As such, hydraulic fluid may be supplied from the source 302 directly to the first shift valve 346. From the first shift valve 346, the fluid may flow to the fifth trim system. As described above, the fifth trim valve 326 is stroked to allow fluid to fill and apply C6. Although not shown as such in FIG. 14, the valve gain of the fifth trim valve 326 is controllable such that control main pressure may be fed to the boost plug 328. The control main pressure may flow through the channel 344 defined in the boost plug 328 and exert a force against the head end of the fifth trim valve 326. In doing so, the boost plug 328 is not moved with the fifth trim valve 326 to the stroked position, thereby changing the gain across the trim system. This is in contrast to first and third range when C6 is applied. In those ranges, control main pressure is not fed directly to the boost plug 328, and in those lower ranges the boost plug 328 is moved in conjunction with the fifth trim valve 326 to the stroked position.

FIG. 14 generally shows the control main pressure flowing to the boost plug 328. This control main pressure first exits the control main valve 334 and control main filter 336, which is described above. The hydraulic fluid at control main pressure flows from the filter 336 and directly feeds into each pressure control solenoid and each shift solenoid. In ninth range, the first shift solenoid 330 is energized and outputs hydraulic fluid at control main pressure to the first and second shift valves. Control main pressure is also fed to the main modulated solenoid 340. Further, hydraulic fluid at control main pressure may also feed through the third valve portion 2008 and the fourth valve portion 2010 of the third shift valve 350 where it flows through the check valve 352 and to the head of the second shift valve 348 (i.e., on a top side of the first valve portion 1904). The same fluid that flows to the main modulated solenoid 340 and third shift valve 350 also feeds through the second shift valve 348 and pressurizes the second pressure switch 358. As it does so, the fluid at control main pressure is further directed to the fifth trim system where it feeds into an opening of the boost plug 328. Here, the fluid flows through the channel 344 and causes the boost plug 328 to separate from the fifth trim valve 326.

In addition to C6 being applied, C2 is also applied in a similar manner as it is in seventh and eighth ranges. Hydraulic fluid at main pressure is fed from the source 302 directly to the first shift valve 346. With the first shift valve 346 stroked, the fluid is able to flow to the second shift valve 348. With the second shift valve 348 stroked open, the hydraulic fluid is able to flow to the second trim system and through the second trim valve 314 (which is in its stroked position via the second pressure control solenoid 312). As the fluid flows through the second trim system, it is fed back to the second shift valve 348 where it fills and applies C2. C2 pressure may act on differential areas of the first shift valve 346 and the second shift valve 348 to form a hydraulic interlock on both valves. Thus, if power is lost in ninth range and control main pressure is lost at the heads of both shift valves, C2 pressure is able to hydraulically hold the first shift valve 346 and the second shift valve 348 in their stroked positions.

In the event of an electrical power loss while operating in ninth range, the control system 300 may be configured to default to seventh range as shown in FIG. 17. Here, the controller is unable to supply current to any of the solenoids and therefore both of the first and second shift solenoids are de-energized. The normally low pressure control solenoids, i.e., solenoids 320 and 324, default to outputting zero pressure and thus C6 is exhausted once the fifth trim valve 326 moves to its de-stroked position. C4 remains exhausted as the fourth trim valve 322 is in its de-stroked position.

The normally high pressure control solenoids output full pressure to move their respective trim valves to their stroked positions. In other words, the first trim valve 310, the second trim valve 314, and the third trim valve 318 are disposed in their stroked positions. C1, however, is unable to apply because hydraulic fluid is blocked upstream by the de-stroked third shift valve 350. The latched shift valve 348 also prevents fluid from flowing to the C5 clutch as well.

As shown in FIG. 17, hydraulic fluid at main pressure flows directly from the pressure source 302 to the third trim system. With the third trim valve 318 in its stroked and open position, fluid is able to fill and apply C3. The third trim valve 318 is able to trim or reduce the hydraulic fluid from main pressure to C3 pressure to meet the needs of the control system 300. Thus, as described above, C2 and C3 are applied when electrical power is lost when the system is previously operating in ninth range. With C2 and C3 applied, the control system 300 therefore defaults to seventh range.

A further embodiment of the present disclosure is illustrated in FIG. 22. Here, one embodiment of a shift availability table 2200 is illustrated for a multispeed transmission having at least nine forward ranges, neutral, and at least one reverse. This table illustrates how many torque-transmitting mechanisms are released or engaged between successive ranges. In first range, for example, C5 and C6 may be engaged (as shown above in the table). If an upshift to second range is desired, the table 2200 illustrates only one (1) torque-transmitting mechanism changes between first and second ranges. As described above, C1 and C5 are applied in second range. Thus, C5 is a common torque-transmitting mechanism and it remains applied during the upshift. Meanwhile, C6 may be unapplied and C1 applied during the upshift. Similarly, if the controller wants to do a skip shift and upshift from first range to third range, and thus "skip" second range, the controller is able to do so by only engaging one new torque-transmitting and disengaging one torque-transmitting mechanism. As described above, C1 and C6 are applied in third range. Thus, if doing a skip shift from first range to third range, the controller may do so by controlling the control system 300 to release C5 and apply C1. Here, C6 is a common torque-transmitting mechanism between first and third ranges. These shifts can be desirable because the controller does not have to transition the control system 300 through neutral first before achieving the desired range.

In another example, the transmission may operate in fourth range with C1 and C4 applied. If the controller wants to downshift to first range and skip second and third ranges, the shift availability table 2200 indicates that two (2) new torque-transmitting mechanisms will need to be applied. Moreover, both C1 and C4 will need to be disengaged during the downshift. Again, in first range, C5 and C6 are applied. To complete the downshift from fourth range to first range, the controller will operably control the control system 300 such that C1 and C4 are exhausted while C5 and C6 are applied.

Further, and as described above, the design of the control system 300 allows the de-energization of the second shift valve 332 to control the third shift valve 350 to its de-stroked position, which in effect blocks the main feed of fluid to the second trim system. As a result, C5 is unable to apply in third, fourth or fifth ranges. The logic state of this, however, does not negatively affect the skip shift capability of the control system 300. Moreover, in seventh, eighth and ninth ranges, the third shift valve 350 is controlled to its de-stroked position which effectively blocks the main feed of hydraulic fluid to the first trim system. Thus, C1 cannot be applied in these higher ranges and thus provides an improved failure mode protection to the control system 300, and it is able to do so without impacting the system's skip shift capability.

For purposes of this disclosure, an upshift may refer to a shift transition from a lower range to a higher range (e.g., first range to second range), and a downshift may refer to a shift transition from a higher range to a lower range (e.g., second range to first range). A skip shift may include either an upshift or a downshift, but when it is achieved, the control system skips one or more intermediate ranges when completing the shift transition (e.g., fourth range to first range skips second and third ranges). In addition, a gear ratio from an input to an output of the transmission may be greater than 1.0 at the lower ranges, whereas the gear ratio may be less than 1.0 at the higher ranges. In one embodiment, one of the ranges may provide a gear ratio equal to or approximately 1.0. In any event, the gear ratio may depend upon the architecture of the transmission, and one skilled in the art will appreciate different gear ratios based on different multispeed transmission architectures. Thus, the present disclosure does not provide any specific gear ratio for any given range.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An electro-hydraulic control system for a multispeed transmission, comprising:
   a controller for operably controlling the transmission;
   a fluid source for supplying hydraulic fluid;
   a plurality of torque-transmitting mechanisms being operably selected between an applied and an unapplied state to achieve a plurality of ranges including at least one reverse, a neutral, and a plurality of forward ranges, wherein in any one of the plurality of forward ranges only two of the plurality of torque-transmitting mechanisms are in the applied state;
   a plurality of trim systems being in electrical communication with the controller and in fluid communication with the fluid source, wherein each of the plurality of trim systems includes a pressure control solenoid and a trim valve;
   a plurality of shift valves each of which is disposed in fluid communication with the fluid source and configured to move between a stroked position and a de-stroked position, the plurality of shift valves including at least a first shift valve, a second shift valve and a third shift valve;
   wherein, when operating in a first forward range at a high transmission output speed, a first torque-transmitting mechanism and a second torque-transmitting mechanism are in their applied states and the other of the plurality of torque-transmitting mechanisms are in their unapplied states;
   wherein, when a shift from the first forward range to neutral is made immediately followed by a loss of electrical power in the system, a hydraulic latch is formed by hydraulic fluid against at least one of the first, second and third shift valves such that the at least one of the first, second and third shift valves is maintained in its stroked position due to the latch.

2. The system of claim 1, further comprising a check valve located between the at least one of the first, second and third shift valves and an exhaust passage to form the latch.

3. The system of claim 1, wherein hydraulic fluid flows from the third shift valve to the second shift valve to form the hydraulic latch and maintain the second shift valve in its stroked position following the shift and loss of electrical power.

4. The system of claim 1, wherein following the shift and loss of electrical power, the system defaults to one of the plurality of forward ranges such that the first torque-transmitting mechanism remains in its applied state and one of the other plurality of torque-transmitting mechanisms is disposed in its applied state.

5. The system of claim 1, further comprising a pressure switch disposed in fluid communication with the at least one of the first, second and third shift valves and in electrical communication with the controller, the pressure switch configured to detect a position of the at least one of the first, second and third shift valves.

6. The system of claim 1, wherein the first torque-transmitting mechanism remains in its applied state and the second torque-transmitting mechanism exhausts to its unapplied state during the shift to neutral such that only the first of the plurality of torque-transmitting mechanisms is in its applied state.

7. The system of claim 1, wherein the latch is formed by a flow restriction and check valve located between the at least one of the first, second and third shift valves and an exhaust passage.

8. An electro-hydraulic control system for a multispeed transmission, comprising:
   a controller for operably controlling the transmission;
   a fluid source for supplying hydraulic fluid;
   a plurality of torque-transmitting mechanisms being operably selected between an applied and an unapplied state to achieve a plurality of ranges including at least one reverse, a neutral, and a plurality of forward ranges, wherein in any one of the plurality of forward ranges only two of the plurality of torque-transmitting mechanisms are in the applied state;
   a plurality of trim systems being in electrical communication with the controller and in fluid communication with the fluid source, wherein each of the plurality of trim systems includes a pressure control solenoid and a trim valve;
   a plurality of shift valves each of which is disposed in fluid communication with the fluid source and configured to move between a stroked position and a de-stroked position, the plurality of shift valves including at least a first shift valve, a second shift valve and a third shift valve;
   a first shift solenoid and a second shift solenoid each of which is disposed in electrical communication with the controller, only the first shift solenoid being operably controlled between an energized and de-energized states to control movement of the first and second shift valves, and the second shift solenoid being operably controlled between an energized and de-energized states to control movement of the third shift valve;
   wherein:
   in a first forward range of the plurality of forward ranges, a first torque-transmitting mechanism and a second torque-transmitting mechanism are in their applied states;
   only the first shift solenoid is energized to control movement of the first and second shift valves to their stroked positions such that hydraulic fluid at a head of each of the first and second shift valves forces both shift valves to their stroked positions;
   further wherein, when shifting from the first forward range to neutral, the first torque-transmitting mechanism remains in its applied state as the only applied torque-transmitting mechanism, and the second torque-transmitting mechanism is exhausted.

9. The system of claim 8, wherein, during a loss of electrical power in the system, a latch is formed by hydraulic fluid in the system against at least one of the first, second and third shift valves when shifting to neutral from the first forward range to maintain the at least one of the first, second and third shift valves in its stroked position.

10. The system of claim 9, wherein at least one of the first and second shift valves is maintained in its stroked position due to the latch, and the third shift valve is maintained in its de-stroked position.

11. The system of claim 9, wherein the first and second shift valves are maintained in their stroked positions due to the latch.

12. The system of claim 9, wherein the latch is formed by a check valve located between the at least one of the first, second and third shift valves and an exhaust passage.

13. The system of claim 9, wherein the latch is formed by a flow restriction and check valve located between the at least one of the first, second and third shift valves and an exhaust passage.

14. The system of claim 8, further comprising a pressure switch disposed in fluid communication with the at least one of the first, second and third shift valves and in electrical communication with the controller, the pressure switch configured to detect a position of the at least one of the first, second and third shift valves.

15. An electro-hydraulic control system for a multispeed transmission, comprising:
   a controller for operably controlling the transmission;
   a fluid source for supplying hydraulic fluid;
   a plurality of torque-transmitting mechanisms being operably selected between an applied and an unapplied state to achieve a plurality of ranges including at least one reverse, a neutral, and a plurality of forward ranges, wherein in any one of the plurality of forward ranges only two of the plurality of torque-transmitting mechanisms are in the applied state;
   a plurality of trim systems being in electrical communication with the controller and in fluid communication with the fluid source, wherein each of the plurality of trim systems includes a pressure control solenoid and a trim valve;
   a plurality of shift valves each of which is disposed in fluid communication with the fluid source and configured to move between a stroked position and a de-stroked position, the plurality of shift valves including at least a first shift valve, a second shift valve and a third shift valve;
   a first shift solenoid disposed in electrical communication with the controller, only the first shift solenoid being operably controlled between an energized and de-energized states to control movement of the first and second shift valves; and
   a second shift solenoid disposed in electrical communication with the controller, the second shift solenoid being operably controlled between an energized and de-energized states to control movement of the third shift valve;
   wherein, movement of the first shift valve between its stroked and de-stroked positions is operably controlled by the controller to select a desired range of the plurality of ranges.

16. The system of claim 15, wherein:

in neutral and the at least one reverse, the controller operably controls movement of the first shift valve to its de-stroked position; and in each of the plurality of forward ranges, the controller operably controls movement of the first shift valve to its stroked position.

17. The system of claim 15, further comprising a plurality of pressure switches disposed in electrical communication with the controller, the plurality of pressure switches comprising at least a first pressure switch, a second pressure switch and a third pressure switch.

18. The system of claim 17, wherein:

the first pressure switch is in fluid communication with the first shift valve to detect a position thereof;

the second pressure switch is in fluid communication with the second shift valve to detect a position thereof; and the third pressure switch is in fluid communication with the third shift valve to detect a position thereof.

19. The system of claim 18, wherein:

in neutral and the at least one reverse, the controller operably controls movement of the first shift valve to its de-stroked position;

in each of the plurality of forward ranges, the controller operably controls movement of the first shift valve to its stroked position;

the first pressure switch is either pressurized or not pressurized based on the position of the first shift valve; and the controller operably detects the position of the first shift valve based on whether the first pressure switch is pressurized or not pressurized.

20. The system of claim 17, further comprising:

a fourth pressure switch disposed in fluid communication with a first trim system of the plurality of trim systems; and a first torque-transmitting mechanism of the plurality of torque-transmitting mechanisms being in fluid communication with the first trim system;

wherein, the fourth pressure switch is either pressurized or not pressurized based upon a position of the trim valve of the first trim system;

further wherein, the position of the trim valve and whether the first torque-transmitting mechanism is in its applied state or unapplied state is operably detectable by the controller based on if the fourth pressure switch is pressurized or not.

* * * * *